US012094433B2

(12) United States Patent
Kwa et al.

(10) Patent No.: US 12,094,433 B2
(45) Date of Patent: Sep. 17, 2024

(54) LOW POWER DISPLAY REFRESH DURING SEMI-ACTIVE WORKLOADS

(71) Applicant: Intel Corporation, Santa Clara, CA (US)

(72) Inventors: Seh Kwa, Saratoga, CA (US); Huan Yu, China (JP); Partha Robert Choudhury, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 17/134,295

(22) Filed: Dec. 26, 2020

(65) Prior Publication Data

US 2021/0118393 A1 Apr. 22, 2021

(51) Int. Cl.
*G09G 3/36* (2006.01)

(52) U.S. Cl.
CPC ......... *G09G 3/3685* (2013.01); *G09G 3/3674* (2013.01); *G09G 2310/04* (2013.01); *G09G 2310/08* (2013.01); *G09G 2330/023* (2013.01)

(58) Field of Classification Search
CPC ............... G09G 3/3685; G09G 3/3674; G09G 2310/04; G09G 2310/08; G09G 2330/023; G09G 3/2092; G09G 2330/021; G09G 2340/0435
See application file for complete search history.

(56) References Cited

U.S. PATENT DOCUMENTS 10,469,674 B1 * 11/2019 Fukushima ........ H04N 1/00411
2011/0115690 A1 * 5/2011 Cummings .............. G09G 3/20 345/3.1
2013/0021229 A1 1/2013 Ludden et al.
2013/0148740 A1 * 6/2013 Samanta Singhar .. G09G 5/003 375/E7.2
2013/0314386 A1 11/2013 Han et al.
2014/0168187 A1 * 6/2014 Qu ....................... G09G 3/3688 345/212

(Continued)

FOREIGN PATENT DOCUMENTS

JP 2016035488 A 3/2016
KR 1020130091626 A 8/2013

(Continued)

OTHER PUBLICATIONS

PCT Dec. 29, 2021 International Search Report from International Application No. PCT/US2021/051701.

*Primary Examiner* — Ibrahim A Khan
(74) *Attorney, Agent, or Firm* — Banner & Witcoff Ltd.

(57) ABSTRACT

Particular embodiments described herein provide for an electronic device that includes a display and is configured to enable a low power display refresh during a semi-active workload. The electronic device can include a display engine and a display panel and a frame is used by the display panel to generate an image on a display backplane. The display panel includes the display backplane, a plurality of row drivers, a plurality of column drivers, and a timing controller. The timing controller can receive a partial update to a frame being displayed as an image on the display backplane and update the image displayed on the display backplane by activating row drivers and a subset of the plurality of available column drivers, wherein the subset is based on the update.

20 Claims, 14 Drawing Sheets

(56) References Cited

U.S. PATENT DOCUMENTS

| | | | | |
|---|---|---|---|---|
| 2015/0054800 | A1* | 2/2015 | Kim | G09G 3/3648 345/204 |
| 2015/0130824 | A1* | 5/2015 | Lee | G09G 3/20 345/534 |
| 2015/0134985 | A1* | 5/2015 | Gopal | G06F 1/3287 713/320 |
| 2015/0339967 | A1* | 11/2015 | Shin | G09G 3/2003 345/690 |
| 2016/0086565 | A1* | 3/2016 | Ryu | G09G 5/003 345/211 |
| 2016/0284323 | A1* | 9/2016 | Neugebauer | G06F 3/1415 |
| 2016/0329033 | A1* | 11/2016 | Woo | G09G 5/393 |
| 2016/0358303 | A1* | 12/2016 | Juliano | G09G 5/395 |
| 2016/0371808 | A1* | 12/2016 | Croxford | G09G 5/026 |
| 2017/0236466 | A1* | 8/2017 | Spitzer | G09G 3/3266 345/560 |
| 2017/0295343 | A1* | 10/2017 | Konishi | G09G 3/2096 |
| 2017/0308226 | A1* | 10/2017 | Yoo | G06F 3/03545 |
| 2019/0156785 | A1* | 5/2019 | Marchya | G09G 3/2096 |
| 2019/0206329 | A1 | 7/2019 | Lee et al. | |
| 2019/0341007 | A1* | 11/2019 | Holland | G06F 3/1415 |
| 2021/0012717 | A1* | 1/2021 | Park | G09G 3/20 |
| 2021/0027722 | A1* | 1/2021 | Rao | G06F 3/0412 |
| 2021/0109623 | A1* | 4/2021 | Bae | G06F 3/0414 |
| 2021/0118393 | A1 | 4/2021 | Kwa et al. | |
| 2021/0201746 | A1* | 7/2021 | Seo | G09G 3/2059 |
| 2021/0358358 | A1* | 11/2021 | Ma | G09G 5/395 |

FOREIGN PATENT DOCUMENTS

| | | | |
|---|---|---|---|
| TW | 202225949 | A | 7/2022 |
| WO | 2022139919 | A1 | 6/2022 |

* cited by examiner

LOW POWER DISPLAY REFRESH DURING SEMI-ACTIVE WORKLOADS

TECHNICAL FIELD

This disclosure relates in general to the field of computing, and more particularly, to a system for enabling a low power display refresh during a semi-active workload.

BACKGROUND

End users have more electronic device choices than ever before. A number of prominent technological trends are currently afoot and these trends are changing the electronic device landscape. Some of the technological trends involve a device that includes a display.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
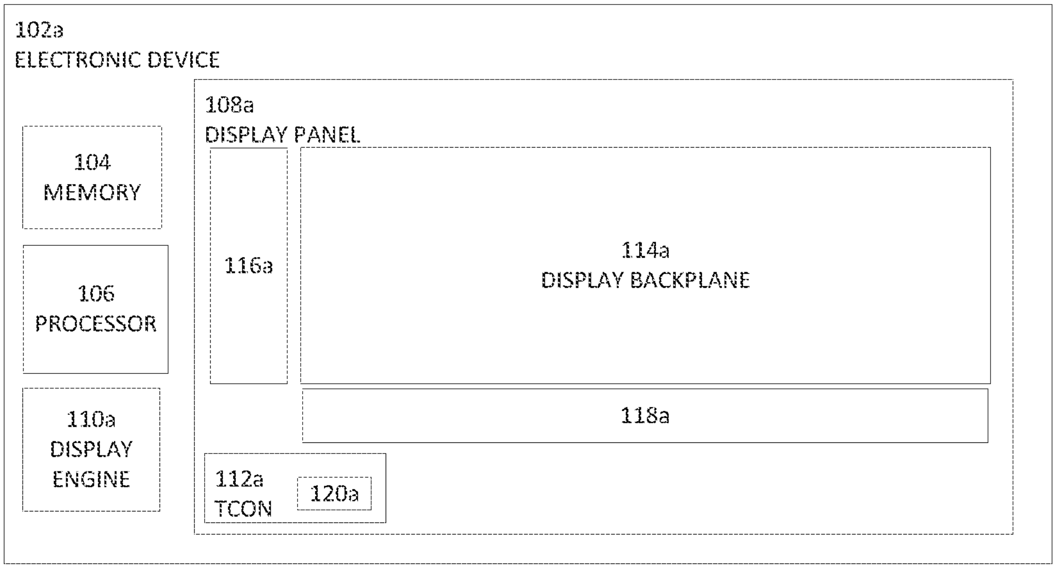
FIG. 1 is a simplified block diagram of a system to enable a low power display refresh during a semi-active workload, in accordance with an embodiment of the present disclosure.
Figure 1:
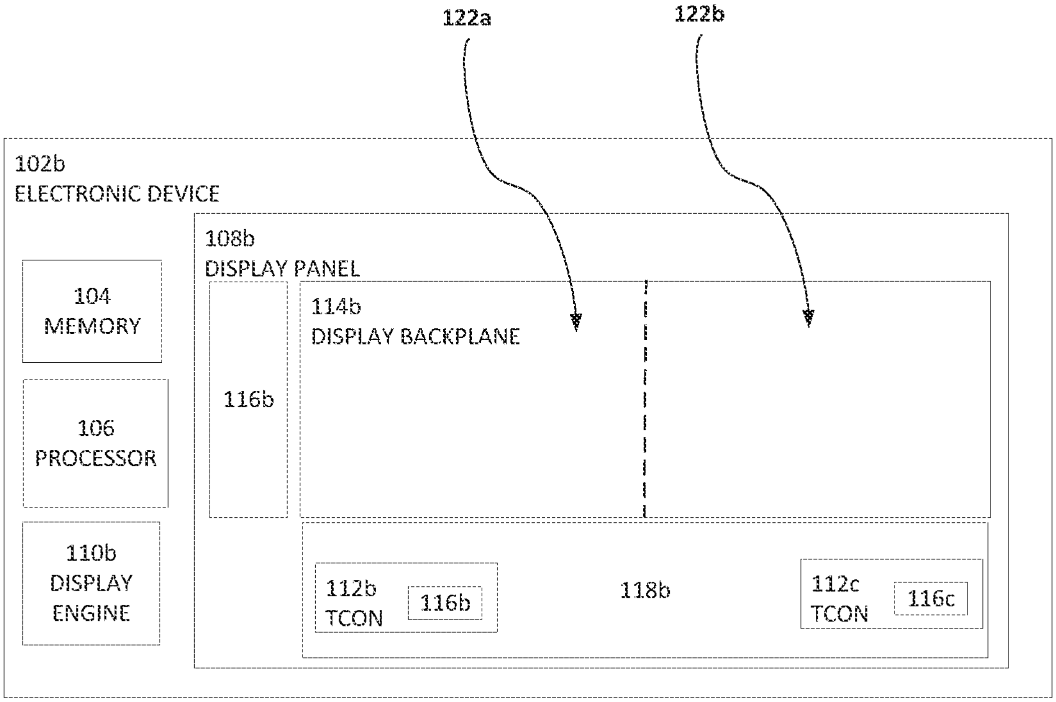

The FIGURES of the drawings are not necessarily drawn to scale, as their dimensions can be varied considerably without departing from the scope of the present disclosure.

DETAILED DESCRIPTION

The following detailed description sets forth examples of apparatuses, methods, and systems relating to enabling a low power display refresh during a semi-active workload in accordance with an embodiment of the present disclosure. The term "semi-active workload" includes where an entire frame being used to display content on a display does not need to be updated and a majority of the content is static so only a partial refresh of the frame is needed. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

The terms "over," "under," "below," "between," and "on" as used herein refer to a relative position of one layer or component with respect to other layers or components. For example, one layer or component disposed over or under another layer or component may be directly in contact with the other layer or component or may have one or more intervening layers or components. Moreover, one layer or component disposed between two layers or components may be directly in contact with the two layers or components or may have one or more intervening layers or components. In contrast, a first layer or first component "directly on" a second layer or second component is in direct contact with that second layer or second component. Similarly, unless explicitly stated otherwise, one feature disposed between two features may be in direct contact with the adjacent features or may have one or more intervening layers.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example. The term "about" includes a plus or minus fifteen percent (±15%) variation.

FIG. 1 is a simplified block diagram of electronic devices configured to enable a low power display refresh during a semi-active workload, in accordance with an embodiment of the present disclosure. In an example, an electronic device 102*a* can include memory 104, one or more processors 106, a display panel 108*a*, and a display engine 110*a*. Display panel 108*a* can include a timing controller (TCON) 112*a*, a display backplane 114*a*, a plurality of row drivers 116*a*, and a plurality of column drivers 118*a*. In some examples, TCON 112*a* can include a display frame buffer 120*a*.

An electronic device 102*b* can include memory 104, one or more processors 106, a display engine 110*b*, and a display panel 108*b*. Display panel 108*b* can include a first TCON 112*b*, a second TCON 112*c*, a display backplane 114*b*, plurality of row drivers 116*b*, plurality of column drivers 118*b*, a first display portion 122*a*, and a second display portion 122*b*. In an example, first TCON 112*b* and second TCON 112*c* can be integrated with plurality of column drivers 118*b*. This can allow the system to partition the display into segments. For example, first TCON 112*b* can be configured to drive or control first display portion 122*a* of display backplane 114*b* and second TCON 112*c* can be configured to drive or control second display portion 122*b* of display backplane 114*b*. First TCON 112*b* can include a display frame buffer 120*b* and second TCON 112*c* can include a display frame buffer 120*c*. Display backplanes 114*a* and 114*b* can be an array of display pixels. It should be noted that while two TCONs (first TCON 112*b* and second TCON 112*c*) are illustrated in FIG. 1, a plurality of TCONs can be used where each of the plurality of TCONs control a different portion of display backplane 114*b*.

Display panels 108*a* and 108*b* can each display an image to a user and each may be any of a variety of types of display devices, including without limitation, an LCD display, a plasma display, an LED display, an OLED display, a projector, etc. Display engine 110*a* can be located on a system on chip (SoC) and be configured to help display an image on display panel 108*a*. In addition, display engine 110*b* can be located on an SoC and be configured to help display an image on display panel 108*b*. Each of TCONs 114*a*-114*c* are a timing controller on the display side.

More specifically, display engine 110*a* is responsible for transforming mathematical equations into individual pixels and frames and communicating the individual pixel and frames to TCON 114*a* as a video stream with a frame rate. TCON 112*a* receives the individual frames generated by display engine 110*a*, corrects for color and brightness, controls the refresh rate, controls power savings of display panel 108*a*, touch (if enabled), etc. TCON 112*a* communicates with plurality of row drivers 116*a* and plurality of column drivers 118*a*. Plurality of row drivers 116*a* are the selectors that select what pixels to latch on the pixel analog value for red, green, and blue (RGB) in display backplane 114*a*. Plurality of column drivers 118*a* are the RGB provider and take the digital value of RGB information from TCON 112*a* and converts the digital value to the analog value to drive the pixel information in display backplane 114*a*.

In addition, display engine 110*b* in electronic device 102*b* is responsible for transforming mathematical equations into individual pixels and frames and communicating the individual pixel and frames to first TCON 112*b* and second TCON 112*c* as a video stream with a frame rate. First TCON 112*b* can be configured to drive or control first display portion 122*a* of display backplane 114*b* and second TCON 112*c* can be configured to drive or control second display portion 122*b* of display backplane 114*b*. First TCON 112*b* and second TCON 112*c* receive the individual frames generated by display engine 110*b*, correct for color and brightness, control the refresh rate, control power savings of display panel 108*a*, touch (if enabled), etc. First TCON 112*b* and second TCON 112*c* communicate with plurality of row drivers 116*b* and plurality of column drivers 118*b*. Plurality of row drivers 116*b* are the selector that selects what pixels to latch on the pixel analog value for RGB in display backplane 114*b*. Plurality of column drivers 118*b* are the RGB provider and receive the digital value of RGB information from first TCON 112*b* and second TCON 112*c* and convert the digital value to the analog value to drive the pixel information in display backplane 114*b*.

In some current systems, the traditional raster scan mechanism is row-wise and the scanning will go from row one, left to right, and then step to the next row. When the display engine of some current systems sends an area of change spanning in a horizontal row-wise manner, all the column drivers will need to remain active to send the corresponding color information. Some row drivers may be power managed if they are not required for the update. Because the TCON of some current systems has an integrated frame buffer, the other unchanged rows can be self-refreshed when refresh timing dictates (e.g., 60 Hz, 30 Hz, 10 Hz, etc. depending on the display backplane properties) but all the column drivers will need to remain active.

Some systems are configured for panel self-refresh. Panel self-refresh affords reduction in pixel updates as a function of change and provides a power reduction especially for the display engine of current systems and associated memory as well as power delivery. Display panel power reduction is compelling because display power tends to dominate system power and therefore can greatly impact expected battery life for a given battery capacity. In current systems, the display engine would combine the changes from different frames and send the changes to the display in a row-wise raster scan manner. For example, if there is a cursor update for a frame, the cursor bitmap would be composited with the original unchanged frame to generate the required pixel changes. Then the required pixel changes will be sent to the display in a row-wise manner. The current systems are based on a traditional row-wise raster scan approach when all pixels for all frames will be continuously updated regardless of whether there is any change from frame to frame.

The following examples are described with respect to electronic device 102*a*, display panel 108*a*, display engine 110*a*, TCON 112*a*, display backplane 114*a*, plurality of row drivers 116*a*, and plurality of column drivers 118*a*, however, the following examples can also be applicable to electronic device 102*b* display panel 108*b*, display engine 110*b*, TCONS 112*b* and 112*c*, display backplane 114*b*, plurality of row drivers 116*b*, and plurality of column drivers 118*b*. Electronic device 102*a* can be configured to change the way pixel updates are delivered to the display panel to afford power management as well as introducing the ability to simplify object updates when the object update is the only change to a frame. In an example, the system changes the update from a row-wise operation to a column-wise operation and the system can be configured to update the display from a column driver standpoint rather than a row driver standpoint. More specifically, TCON 112*a* can be configured to update display panel 108*a* by sending control signals to plurality of row drivers 116*a* and plurality of column drivers 118*a* in a column-wise manner rather than a row-wise manner. This allows some of the column drivers to be off or not active and power can be saved. More specifically, in some updates, only one or two columns might need to update the RGB information and the rest of the columns do not need to update the RGB information so they can be off or not active during the update and power can be saved. This can provide primarily battery life improvement.

In some examples, the system can be configured to change how pixel delivery from display engine 110*a* to the TCON 112*a* may behave even with existing raster scan approaches that send an area of change. For example, upon receiving the areas of change from display engine 110*a*, TCON 112*a* can consider the areas of change based on the columns of changes instead of how current systems implement the areas of change based on rows of changes. Doing so allows the unused column drivers to be power managed which can help to reduce the amount of power used by display panel 108*a*. In an example, the other unchanged columns will be self-refreshed when the refresh timing dictates.

In addition, in some examples, the system can configure a representation (e.g., a bitmap) of an object (e.g., a cursor, timer, etc.) that can be invoked by TCON 112*a*. More specifically, display engine 110*a* can generate the starting address of a representation of the object (e.g., a bitmap) for an object to TCON 112*a* when the movement of the object is the only update to a frame. The starting address of the representation of the object can be communicated to TCON 112*a* through commands on sideband channels or special commands delivered through the display interface for a short period such as the vertical blanking period. TCON 112*a* will then read the starting address of the representation of the object and composite the object with the existing frame in the frame buffer to create the updated portions of the frame to be displayed on display panel 108*a*. Doing so has the advantage of keeping the display interface power managed for extended period as well as decoupling the composite function of a very simple operation from the high-performance capable display engine 110*a* and can help keep display engine 110*a* in a low power state for a longer period of time.

It is to be understood that other embodiments may be utilized and structural changes may be made without departing from the scope of the present disclosure. Substantial flexibility is provided by an electronic device in that any suitable arrangements and configuration may be provided without departing from the teachings of the present disclosure.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of electronic devices 102*a* and 102*b*, the following foundational information may be viewed as a basis from which the present disclosure may be properly explained. Generally, a display (e.g., display panel, computer display, computer monitor, monitor, etc.) is an output device that displays information in pictorial form as a frame. A frame is a single still image created by the display engine for display on a display. The frame rate is the number or amount of these images that are displayed in one second. For a video, display engine will create a frame that is then combined in a rapid slideshow with other frames, each one slightly different, to achieve the illusion of natural motion. To produce, or render, a new frame, the display engine determines the physics, positions, and textures of the objects in the scene to produce an image.

While a frame is displayed on the display, the frame is refreshed at a refresh rate. The refresh rate is the frequency that the image on the display is refreshed. The image on the display is typically refreshed sixty (60) times a second where every $60^{th}$ of a second, a display engine (e.g., a processor, dedicated graphics processor, graphics engine, source, etc.) will generate a new image to display and send it to the display. Most displays have a TCON. The TCON will receive image data from the display engine and the TCON is responsible for turning off and on the pixels that will generate the image. If there is no new image data received from the display engine, the display will still refresh at sixty (60) Hz per second because the pixels in the display will decay away if not refreshed. A static image on a display is not really a static image, even though the image is not changing because it is being rewritten or redisplayed sixty (60) times a second for a display with a sixty (60) Hz refresh rate.

More specifically, a display engine (e.g., computer processing unit (CPU), graphics processing unit (GPU) video processor, etc.) communicates with a TCON and the TCON is configured to drive the display. Most video processors communicate with the TCON using the embedded DisplayPort (eDP) specification. The eDP specification was developed to be used specifically in embedded display applications such as laptops, notebook computers, desktops, all-in-one personal computers, etc. The display engine needs to keep sending video signals to the TCON at a constant rate. This rate, known as the frame rate, is typically at least sixty (60) Hz, meaning that the display engine has to send the video signal in a video stream to the TCON at least sixty (60) times per second, even when there is no change in the image because most display panels are such that the pixels will decay away if not refreshed. This can consume a relatively large amount of power so panel self refresh (PSR) was developed to save power for full-screen images. The idea behind PSR is to shut down the display engine and associated circuitry when the image to be displayed on a display is static. More specifically, most current TCONs include a frame buffer and the frame buffer in the TCON can maintain a display image without receiving video image data from the display engine. For a static image, this allows the display engine to enter a low-power state. Allowing the display engine to power down between display updates can save some power and extend the battery life.

Panel self-refresh with selective update (PSR2) is a superset of the panel self-refresh feature and it allows the transmission of modified areas within a video frame and a low latency self-refresh state. PSR2 identifies when only a portion of the screen is static, which is a selective update. The PSR2 is part of the eDP specification and a feature that TCON vendors can choose to include in their timing controller chips. PSR2 requires the display to have a frame buffer and if the display has a frame buffer, then the display can perform a self-refresh using the frame buffer when PSR2 mode is enabled.

Lowering the refresh rate helps lower the display power, which in turn lowers the system power and increases battery life. The refresh rate is the number of times in a second that a display hardware updates its buffer. This is distinct from the measure of the frame rate. The refresh rate includes the repeated drawing of identical frames, while frame rate measures how often a display engine can feed an entire frame of new data to the display in a video stream. The refresh rate is the number of times the display updates with new images each second. For example, a sixty (60) Hz refresh rate means the display updates sixty (60) times per second.

One of the most popular means of reducing the display power is to lower the display refresh rate. Currently, there are already several features to lower the display refresh rate (e.g., dynamic refresh rate switch (DRRS), seamless DRRS (sDRRS), dynamic media refresh rate switch (DMRRS), lower refresh rate (LRR and LRR2)), but they are all display engine driven and have latency overhead on entry and exit making it feasible only for latency-insensitivity usages like pervasive idle and for fixed refresh rate scenarios such as full screen video playback (e.g., forty-eight (48) Hz or twenty-four (24) Hz). Also, changing the refresh rate takes at least several hundred milliseconds, making these features non-usable for semi-active workloads like browsing and productivity which operate at around twenty (20) to thirty (30) frames per second.

In addition, some current systems can be configured to lower the refresh rate and lower the display power (in some cases lower the display engine power as well) for desktop idle, but each have their drawbacks, especially for a semi-active workload. Some of these current systems lack a low latency state to lower the display refresh rate and they are not feasible for semi-active workloads. Some systems have a frame skip feature from the TCON that lowers the display refresh rate when in PSR2 deep sleep without the display engine control. This feature offers display power savings for usages like desktop idle. But again, even this method does not have a solution for a semi-active workload and does not support a lower refresh rate for semi-active workloads because they lower the refresh rate only after a latency of one or more frames and after determining that there is no frame change from display engine. What is needed is a system and method that can help to reduce the power consumption of the display during semi-active workloads.

A system and method to help enable a low power display refresh during a semi-active workload can resolve these issues (and others). In an example, an electronic device (e.g., electronic device 102) can include a TCON (e.g., TCON 112*a*) that is configured to update the display from a column driver standpoint rather than a row driver standpoint. The TCON can be configured to update the display by sending control signals to row drivers and column drivers in a column-wise manner rather than a row-wise manner. This allows some of the column drivers to be off or not active when they are not needed and power can be saved. For example, sometimes only one or two columns might need to update the RGB information (or other displayed colors) for an area of pixels and the rest of the columns do not need to update the RGB information for the pixels outside of the area. The columns that do not need to update the RGB information for the pixels outside of the area can be off or not active during the update and power can be saved. This can provide battery life improvement.

More specifically, the TCON represents the timing controller which is responsible for the raster scan timing control as well as receiving digital pixel data (RGB data) from the display engine and delivering the digital pixel data to the column driver(s). The column drivers translate the digital pixel data into analog values and sends the analog pixel values to the columns of pixels in the display backplane. The row drivers send a latch signal based on the raster scan timing to the targeted pixel location to store the color information. Row drivers tend to be at least an order of magnitude simpler in complexity and power than the column drivers. The row drivers also tend to reside at the side bezels which can be very narrow and the narrow bezel cannot house larger, complex semiconductors. Compared to the row drivers, the column drivers are more complex. For example, if one (1) unit of power is allocated to a row driver, then about one-hundred (100) units of power may be allocated to the column driver. By sending control signals to the row drivers and the column drivers in a column-wise manner rather than a row-wise manner, some of the column drivers can be off or not active when not needed and power can be saved.

In addition, the system can configure a representation (e.g., a bitmap) of an object (e.g., a cursor, timer, etc.) that can be invoked by the TCON. The display engine, either through a display driver or hardware can generate the starting address of the representation of the object and communicate the starting address to the TCON when the movement of the object is the only update to a frame. This can be achieved through commands on sideband channels or special commands delivered through the display interface for a short period such as the vertical blanking period. The TCON can composite the object with the existing frame in the frame buffer to create the new frame to be displayed on the display panel. Doing so has the advantage of keeping the display interface power managed for extended period as well as decoupling the composite function of a very simple operation from the high-performance capable display engine and can help keep the display engine in a low power state for a longer period of time.

Regarding the vertical blanking period, within the frame time there is an active frame time and a vertical blanking interval. The amount of active lines determines the active frame time and the amount of vertical blanking lines determines the vertical blanking interval. The active frame lines are the scan lines of a video signal that contain picture information. Most, if not all of the active frame lines are visible on a display. The vertical blanking interval, also known as the vertical interval or VBLANK, is the time between the end of the final visible line of a frame and the beginning of the first visible line of the next frame. The vertical blanking interval is present in analog television, VGA, DVI, and other signals.

The vertical blanking interval was originally needed because in a cathode ray tube monitor, the inductive inertia of the magnetic coils which deflect the electron beam vertically to the position being drawn could not change instantly and time needed to be allocated to account for the time necessary for the position change. Additionally, the speed of older circuits was limited. For horizontal deflection, there is also a pause between successive lines, to allow the beam to return from right to left, called the horizontal blanking interval. Modern CRT circuitry does not require such a long blanking interval, and thin panel displays require none, but the standards were established when the delay was needed and to allow the continued use of older equipment. In analog television systems the vertical blanking interval can be used for datacasting to carry digital data (e.g., various test signals, time codes, closed captioning, teletext, CGMS-A copy-protection indicators, various data encoded by the XDS protocol (e.g., content ratings for V-chip use), etc.), during this time period. The pause between sending video data is sometimes used in real time computer graphics to modify the frame buffer or to provide a time reference to allow switching the source buffer for video output without causing a visible tear in the displayed image.

Various embodiments are generally directed to techniques to communicate display data to one or more display devices through a display interface. Display interfaces (e.g., display port, HDMI, DVI, Thunderbolt®, or the like) provide for the communication of display data between a computing device and a display device. For example, a computing device may transmit display data to a display device using a display interface. Display data includes indications of an image to be displayed. For example, display data includes information (e.g., RGB color data, etc.) corresponding to pixels of the display, that when communicated over the display interface, allows the display device to display an image (e.g., on a screen, by projection, etc.). Various display interfaces exist and the present disclosure is not intended to be limited to a particular display interface. Furthermore, the number of pixels and the displayable colors for each pixel varies for different displays. The number of pixels, the displayable colors, the display type, and other characteristics that may be referenced herein, are referenced to facilitate understanding and is not intended to be limiting.

In some examples, a display device may include a number of TCON and drivers configured to receive display data and cause the display device to display an image based on the display data. The TCON and drivers receive the display data, decode the display data and cause the display device to display an image corresponding to the display data (e.g., by illuminating pixels, projecting colors, etc.). The TCON and drivers may be configured to control or may be operative on the pixels within different portions of the display device. For example, a display device may have two TCONs, with the first set configured to control the pixels in a first portion (e.g., left half, top half, etc.) of the display device while the second set is configured to control the pixels in a second portion (e.g., right half, lower half, etc.) of the display device.

In some examples, multiple displays may receive display data from a single computing device through a display interface. For example, a computing device may be provided with multiple displays. As another example, a computing device may be connected to multiple external displays. Each of the multiple displays may have one or more TCONs and drivers.

In an example, a display interface can be partitioned such that display data (e.g., pixel color information, etc.) may be communicated to multiple TCON and drivers over the display interface. In general, partitioning the display interface according to some examples of the present disclosure includes forming groups of pixels, where each of the groups includes pixels of the display corresponding to a particular TCON and drivers. Each of the groups includes pixels of the display for which a particular TCON and drivers is operative on the pixels of a particular group. One or more display interface lanes then may be assigned to each of the groups. For example, at least one of the display interface lanes may be assigned to each of the groups. Display data may be communicated to the display device by transmitting the display data associated with the pixels in a particular pixel group over the display interface lanes assigned to that pixel group.

In various embodiments, the display device includes two or more TCONs. For example, a display panel may include multiple TCONs configured to receive display data from the display engine and cause the display backplane to display an image corresponding to the display data. In some embodiments, the display panel may be a display having the TCON and drivers integrated as chip-on-glass (COG) components. Furthermore, each of the TCON and drivers may be operative on a different portion of the display. For example, the display backplane may be split into a left half and a right half and provided with two TCONs, each operative on a different half of the display backplane. In some examples, one or more TCONs may only be connected to a portion of the display interface lanes. For example, if the display interface includes four (4) display interface lanes and the display panel includes two TOCNs, the first TCON may be connected to the first and second display interface lanes while the second TCON may be connected to the third and fourth display interface lanes.

In one embodiment, a display engine (e.g., display engine 110*a* or 110*b*) provides display data to a TCON (e.g., display engine 110*a* provide display data to TCON 112*a*, display engine 110*b* provides display data to TCONs 112*b* and 112*c*). The TCON provides control and data signals for displaying data on a display screen (e.g., display panel 108*a* or 108*b*). In one embodiment, a plurality of sets of drivers are responsive to data and control signals from the TCON to cause the display data from the display engine to be displayed on the display screen. In one embodiment, the sets of drivers comprise are row drivers (e.g., row drivers 116*a* or 116*b*) and column drivers (e.g., column drivers 118*a* or 118*b*), which are sometimes referred to gate drivers and source drivers, respectively. Each row driver turns on a switching element that is connected to each sub-pixel electrode of the display panel by a unit of one horizontal line, and each column driver supplies a potential corresponding to display data to pixels of the horizontal line selected by the gate driver The data to be displayed by the set of row drivers and column drivers, along with their control signals are provided by the TCON. The TCON includes a timing signal generator and data transmitter that to provide the data and control signals to the set of row drivers and column drivers. The TCON receives display data from one port of the display engine and provides it to the timing signal generator and the data transmitter. In response to the display data from the display engine, the timing signal generator and data transmitter in the TCON provides RGB data and a column driver signal to the column drivers and provides a row driver control signal to the row drivers. Using the control signals, the sets of row drivers and column drivers display the data on the display panel in a manner well-known in the art In an example implementation, electronic devices 100*a* and 100*b* are meant to encompass an electronic device that includes a display, especially a computer, laptop, electronic notebook, hand held device, wearables, network elements that have a display, or any other device, component, element, or object that has a display. Electronic devices 100*a* and 100*b* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic devices 100*a* and 100*b* may include virtual elements.

Electronic devices 100*a* and 100*b* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic devices 100*a* and 100*b* may include virtual elements.

In regards to the internal structure associated with electronic devices 100*a* and 100*b*, electronic devices 100*a* and 100*b* can include memory elements for storing information to be used in the operations outlined herein. Electronic devices 100*a* and 100*b* may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic devices 100*a* and 100*b* could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of electronic devices 100*a* and 100*b* may include software modules (e.g., display engines 110*a* and 110*b*, TCONs 114*a*-114*c*, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, electronic devices 100*a* and 100*b* may include one or more processors that can execute software, logic, or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements, modules, and machines described herein should be construed as being encompassed within the broad term 'processor.'

Implementations of the embodiments disclosed herein may be formed or carried out on a substrate, such as a non-semiconductor substrate or a semiconductor substrate. In one implementation, the non-semiconductor substrate may be silicon dioxide, an inter-layer dielectric composed of silicon dioxide, silicon nitride, titanium oxide and other transition metal oxides. Although a few examples of materials from which the non-semiconducting substrate may be formed are described here, any material that may serve as a foundation upon which a non-semiconductor device may be built falls within the spirit and scope of the embodiments disclosed herein.

In another implementation, the semiconductor substrate may be a crystalline substrate formed using a bulk silicon or a silicon-on-insulator substructure. In other implementations, the semiconductor substrate may be formed using alternate materials, which may or may not be combined with silicon, that include but are not limited to germanium, indium antimonide, lead telluride, indium arsenide, indium phosphide, gallium arsenide, indium gallium arsenide, gallium antimonide, or other combinations of group III-V or group IV materials. In other examples, the substrate may be a flexible substrate including 2D materials such as graphene and molybdenum disulphide, organic materials such as pentacene, transparent oxides such as indium gallium zinc oxide poly/amorphous (low temperature of dep) III-V semiconductors and germanium/silicon, and other non-silicon flexible substrates. Although a few examples of materials from which the substrate may be formed are described here, any material that may serve as a foundation upon which a semiconductor device may be built falls within the spirit and scope of the embodiments disclosed herein.

Figure 2A:
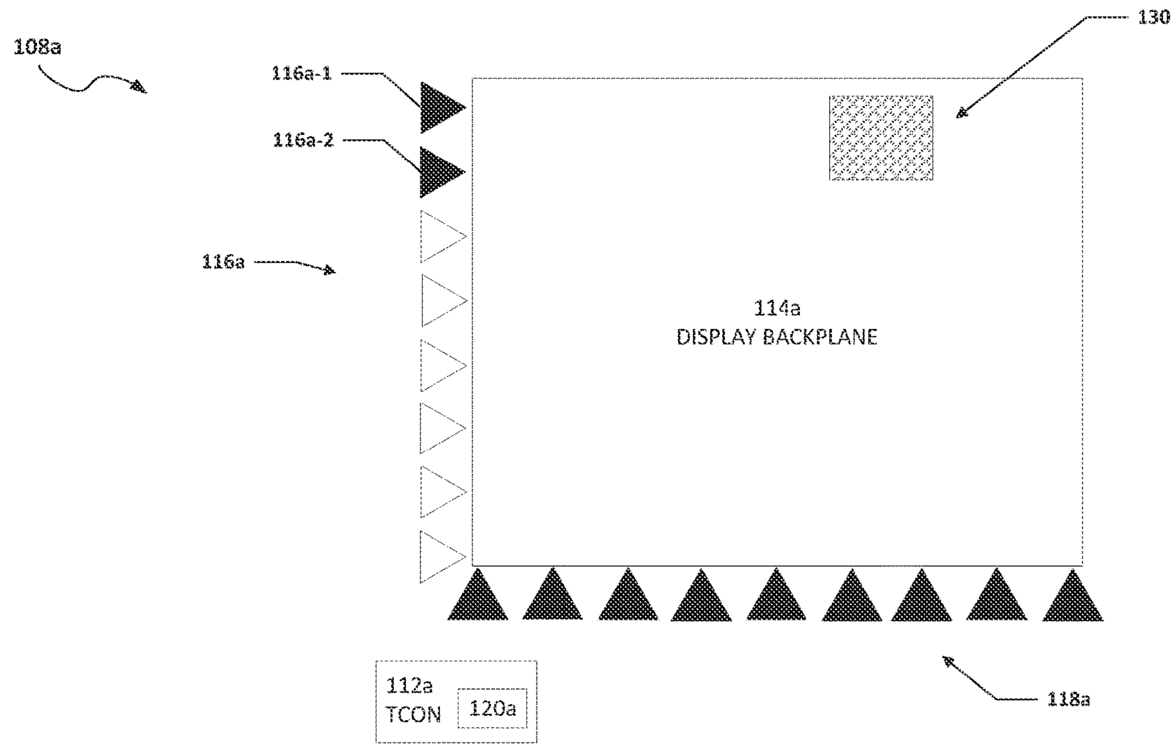
FIG. 2A is a simplified block diagram of a portion of a system to enable a low power display refresh during a semi-active workload, in accordance with an embodiment of the present disclosure.

Turning to FIG. 2A, FIG. 2A is a simplified block diagram of a portion of a system configured to enable a low power display refresh during a semi-active workload, in accordance with an embodiment of the present disclosure. As illustrated in FIG. 2A, display panel 108*a* can include TCON 112*a*, display backplane 114*a*, plurality of row drivers 116*a*, and plurality of column drivers 118*a*. In some examples, TCON 112*a* can include display frame buffer 120*a*.

In an example, an image is displayed on display and update area 130 is the only area of the image that needs to be updated. In some current systems, the traditional raster scan mechanism is row-wise. More specifically, in some current systems all the column drivers remain active, even when only a portion of an image is updated. For example, in some current systems, when an image on a display is updated, all column drivers 118*a* may remain active but not all the row drivers 116*a* may be active. More specifically, if there is an update to an image on display but the update is only in update area 130 in the area of drivers 116*a*-1 and 116*a*-2, then only row drivers 116*a*-1 and 116*a*-2 are sequentially active or activated.

In an example, display engine 110*a* can send the update as a column wise operation rather than a row wise operation. In another example, display engine 110*a* can send the update to TCON 112*a* as a row wise operation and TCON 112*a* can be configured to change the update from a row-wise operation to a column-wise operation and the system can be configured to update the display from a column driver standpoint rather than a row driver standpoint. More specifically, TCON 112*a* can be configured to update display panel 108*a* by sending control signals to plurality of row drivers 116*a* and plurality of column drivers 118*a* in a column-wise manner rather than a row-wise manner. This allows some of the column drivers to be off or not active during the update and power can be saved. In some examples, only a portion of the row drivers (e.g., row drivers 116*a*-1 and 116*a*-2) are active. In other examples, all the row drivers are active but because an individual row driver consume less power than an individual column driver, power can be saved by not activating one or more column drivers, even if all the row drivers are activated.

Figure 2B:
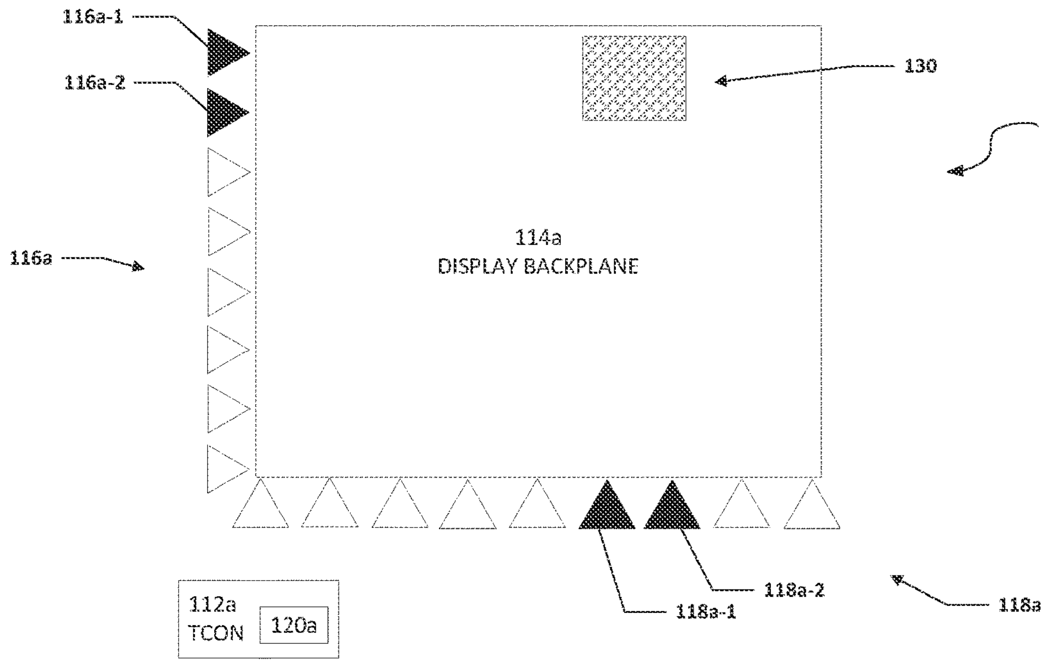
FIG. 2B is a simplified block diagram of a portion of a system to enable a low power display refresh during a semi-active workload, in accordance with an embodiment of the present disclosure.

Turning to FIG. 2B, FIG. 2B is a simplified block diagram of a portion of a system configured to enable a low power display refresh during a semi-active workload, in accordance with an embodiment of the present disclosure. As illustrated in FIG. 2B, display panel 108*a* can include TCON 112*a*, display backplane 114*a*, plurality of row drivers 116*a*, and plurality of column drivers 118*a*. In some examples, TCON 112*a* can include display frame buffer 120*a*. In some current systems, the traditional raster scan mechanism is row-wise. More specifically, in some current systems all the column drivers remain active, even when only a portion of a frame is updated.

In an example, display engine 110*a* can send the update as a column wise operation rather than a row wise operation. In another example, display engine 110*a* can send the update to TCON 112*a* as a row wise operation and TCON 112*a* can be configured to change the update from a row-wise operation to a column-wise operation and the system can be configured to update the display from a column driver standpoint rather than a row driver standpoint. More specifically, TCON 112*a* can be configured to update display panel 108*a* by sending control signals to plurality of row drivers 116*a* and plurality of column drivers 118*a* in a column-wise manner rather than a row-wise manner. This allows some of the column drivers to be off or not active and power can be saved. For example, when a frame is updated and update area 130 is the only area of the image that needs to be updated, only row drivers 116*a*-1 and 116*a*-2 and column drivers 118*a*-1 and 11 *b*8*a*-2 may need to be active and the rest of the column drivers do not need to be active and they can be off or not active during the frame update and power can be saved, and in some examples can help provide battery life improvement.

Figure 3A:
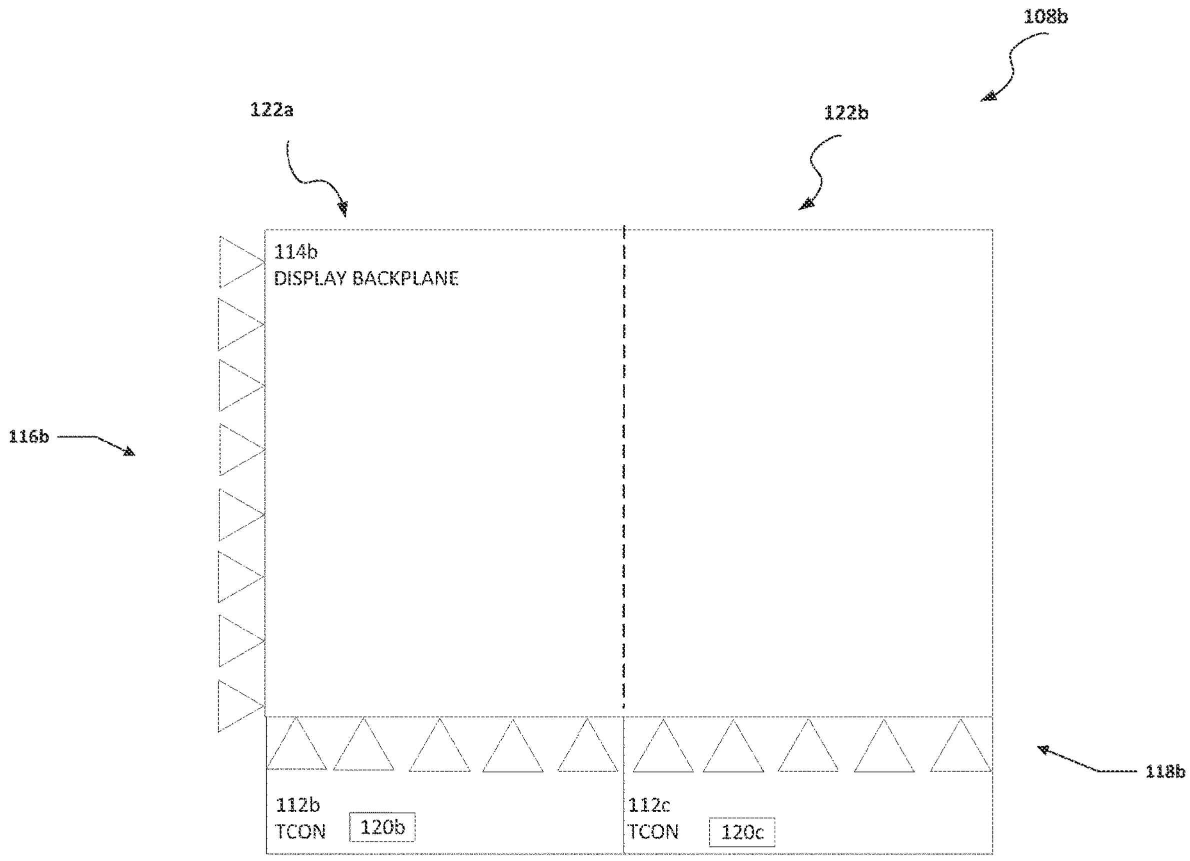
FIG. 3A is a simplified block diagram of a portion of a system to enable a low power display refresh during a semi-active workload, in accordance with an embodiment of the present disclosure.

Turning to FIG. 3A, FIG. 3A is a simplified block diagram of a portion of a system configured to enable a low power display refresh during a semi-active workload, in accordance with an embodiment of the present disclosure. As illustrated in FIG. 3A, display panel 108*b* can include first TCON 112*b*, second TCON 112*c*, display backplane 114*b*, plurality of row drivers 116*b*, plurality of column drivers 118*b*, first display portion 122*a*, and second display portion 122*b*. In an example, first TCON 112*b* and second TCON 112*c* can be integrated with plurality of column drivers 118*b*. First TCON 112*b* can be configured to drive or control first display portion 122*a* of display backplane 114*b* and second TCON 112 can be configured to drive or control second display portion 122*b* of display backplane 114*b*. First TCON 112*b* can include display frame buffer 120*b* and second TCON 112*c* can include display frame buffer 120*c*. In some current systems, the traditional raster scan mechanism is row-wise. More specifically, in some current systems all the column drivers remain active, even when only a portion of a frame is updated. For example, in some current systems, when a frame is updated, all column drivers 118*b* may remain active but only some of row drivers 116*b* are active.

In an example, display engine 110*a* can send the update as a column wise operation rather than a row wise operation. In another example, display engine 110*a* can send the update to first TCON 112*b* and second TCON 112*c* as a row wise operation and TCON 112*b* and TCON 112C can each be configured to change the update from a row-wise operation to a column-wise operation and the system can be configured to update the display from a column driver standpoint rather than a row driver standpoint. More specifically, first TCON 112*b* can be configured to update display panel 108*b* by sending control signals to plurality of row drivers 116*b* and plurality of column drivers 118*b* in a column-wise manner rather than a row-wise manner in first display portion 122*a* of display backplane 114*b* and second TCON 112*c* can be configured to update display panel 108*b* by sending control signals to plurality of row drivers 116*b* and plurality of column drivers 118*b* in a column-wise manner rather than a row-wise manner in second display portion 122*b* of display backplane 114*b*. This allows some of the column drivers to be off or not active and power can be saved.

Figure 3B:
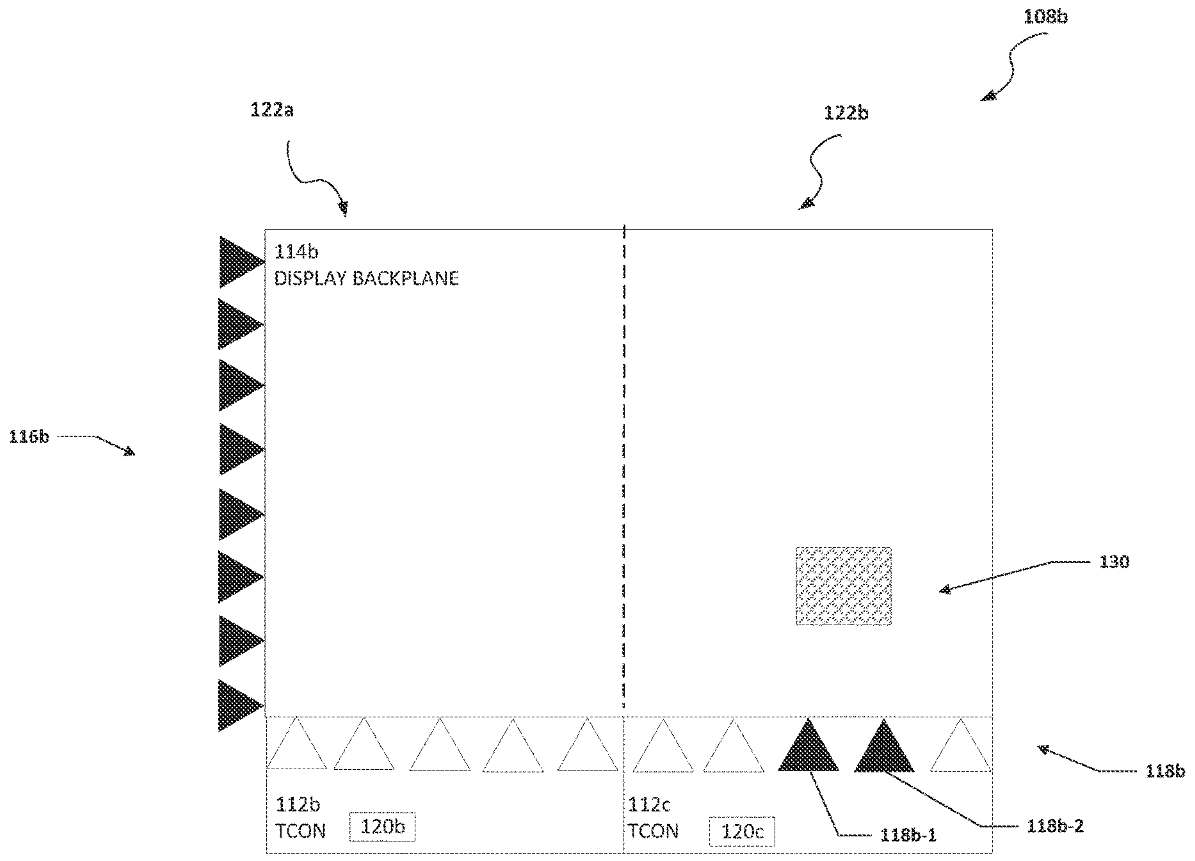
FIG. 3B is a simplified block diagram of a portion of a system to enable a low power display refresh during a semi-active workload, in accordance with an embodiment of the present disclosure.

Turning to FIG. 3B, FIG. 3B is a simplified block diagram of a portion of a system configured to enable a low power display refresh during a semi-active workload, in accordance with an embodiment of the present disclosure. As illustrated in FIG. 3B, display panel 108*b* can include first TCON 112*b*, second TCON 112*c*, display backplane 114*b*, plurality of row drivers 116*b*, plurality of column drivers 118*b*, first display portion 122*a*, and second display portion 122*b*. In an example, first TCON 112*b* and second TCON 112*c* can be integrated with plurality of column drivers 118*b*. This can allow the system to partition the display into segments. For example, first TCON 112*b* can be configured to drive or control first display portion 122*a* of display backplane 114*b* and second TCON 112*c* can be configured to drive or control second display portion 122*b* of display backplane 114*b*. First TCON 112*b* can include display frame buffer 120*b* and second TCON 112*c* can include display frame buffer 120*c*. In some current systems, the traditional raster scan mechanism is row-wise. More specifically, in some current systems all the column drivers remain active, even when only a portion of a frame is updated.

In an example, display engine 110*a* can send the update as a column wise operation rather than a row wise operation. In another example, display engine 110*a* can send the update to first TCON 112*b* and second TCON 112*c* as a row wise operation (as is currently done) and TCON 112*b* and TCON 112C can each be configured to change the update from a row-wise operation to a column-wise operation and the system can be configured to update the display from a column driver standpoint rather than a row driver standpoint. More specifically, first TCON 112*b* can be configured to update display panel 108*b* by sending control signals to plurality of row drivers 116*b* and plurality of column drivers 118*b* in a column-wise manner rather than a row-wise manner in first display portion 122*a* of display backplane 114*b* and second TCON 112*c* can be configured to update display panel 108*b* by sending control signals to plurality of row drivers 116*b* and plurality of column drivers 118*b* in a column-wise manner rather than a row-wise manner in second display portion 122*b* of display backplane 114*b*. This allows some of the column drivers to be off or not active during the frame update and power can be saved. For example, when a frame is updated, only column drivers 118*b*-1 and 118*b*-2 may need to be active and the rest of the column drivers do not need to be active and they can be off or not active and power can be saved. This can provide primarily battery life improvement. It should be noted that while two TCONs (first TCON 112*b* and second TCON 112*c*) are illustrated in FIGS. 3A and 3B, a plurality of TCONs can be used where each of the plurality of TCONs control a different portion of display backplane 114*b*. In some examples, only a portion of the row drivers (e.g., row drivers 116*a*-1 and 116*a*-2 illustrated in FIG. 2B) are active. In other examples, all row drivers 116*b* are active, as illustrated in FIG. 3B, but because an individual row driver consumes less power than an individual column driver, power can be saved by not activating one or more column drivers, even if all the row drivers are activated.

Figure 4:
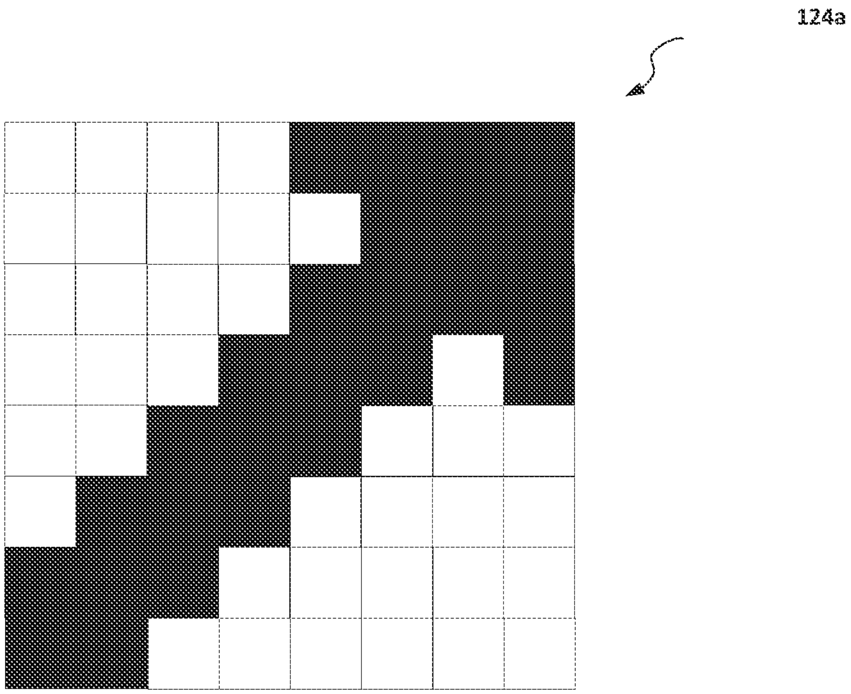
FIG. 4 is a simplified block diagram of a portion of a system to enable a low power display refresh during a semi-active workload, in accordance with an embodiment of the present disclosure.
Figure 4:
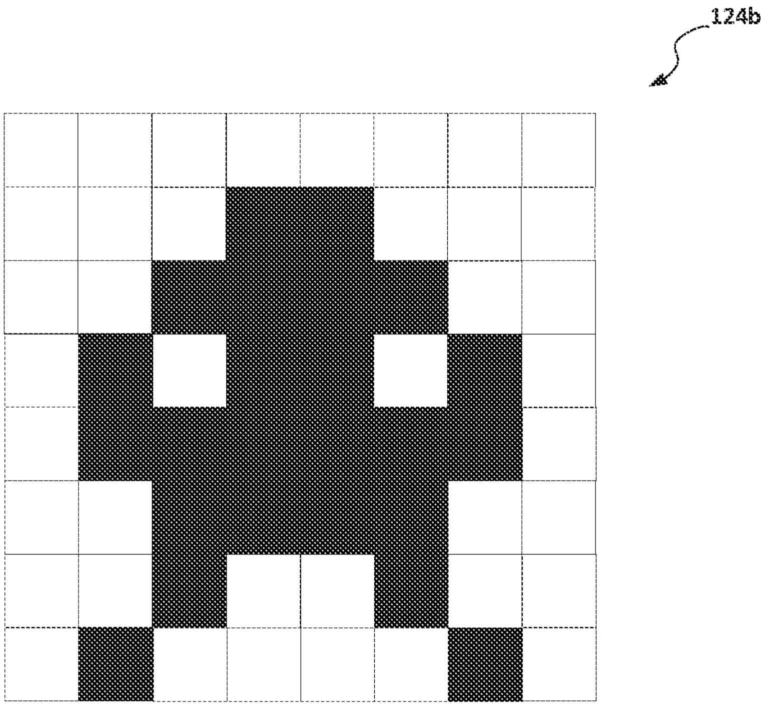

Turning to FIG. 4, FIG. 4 is an example an object that can be used by a system configured to enable a low power display refresh during a semi-active workload, in accordance with an embodiment of the present disclosure. More specifically, as illustrated in FIG. 4, object 124*a* may be a cursor and object 124*b* may be a game character. Objects 124*a* and 124*b* can be used by a TCON when a frame is static except for movement of the object. For example, object 124*a* may be a cursor and can be used by TCON during movement of a cursor while the rest of a display is static. This allows the system to avoid creating a new frame rendering and can add or update only the object information on the display plane. More specifically, when a user is typing in a document program or some other text-based program or application, the mouse cursor typically disappears. Once the user stop typing, the image on the display is static without the cursor. Once the user activates a mouse, trackpad, etc., the cursor appears and moves based on the input from the user. The TCON can perform PSR and add the cursor to the static image. In another example, a background of game being played by a user may be static on the display but a character in the game is moving through the static background and/or an object in the game is moving through the static background. The TCON can perform PSR and add the character and/or object to the static background.

The system can pre-program the object and then store the object in memory. A display engine can send a starting address or some other location of the object and have the TCON modify a static image with the pre-programed object. The starting address is an identifier for locating the placement of the object in the static image. More specifically, the TCON can integrate the object's movement into the frame information that is already in the TCON frame buffer. By integrating the object into the frame information across several frames, the object can be perceived by the user to move across a static background. The TCON must be able to do panel self-refreshing or panel replay.

The objects (e.g., object 124*a* and 124*b*) are only examples of objects that may be used by the system and other objects may be used. For example, the object may be a different cursor, a timer, a different character moving around a static map, an amount or count (e.g., a number of gems or minerals as they are mined in a game), or some other relatively small group of pixels that changes in a static or semi-static frame. The size of the object can be sixty-four (64) bits by sixty-four (64) bits, one-hundred and twenty (120) bits by one-hundred and twenty (120) bits, two-hundred and fifty-six (256) bits by two-hundred and fifty-six (256) bits, or some other size based on the complexity of the object and design constraints. Also, the number of objects that can be used at the same time can be one or more and is only limited by the complexity of the one or more objects and design constraints. In some examples, the object is stored as a bitmap.

Figure 5:
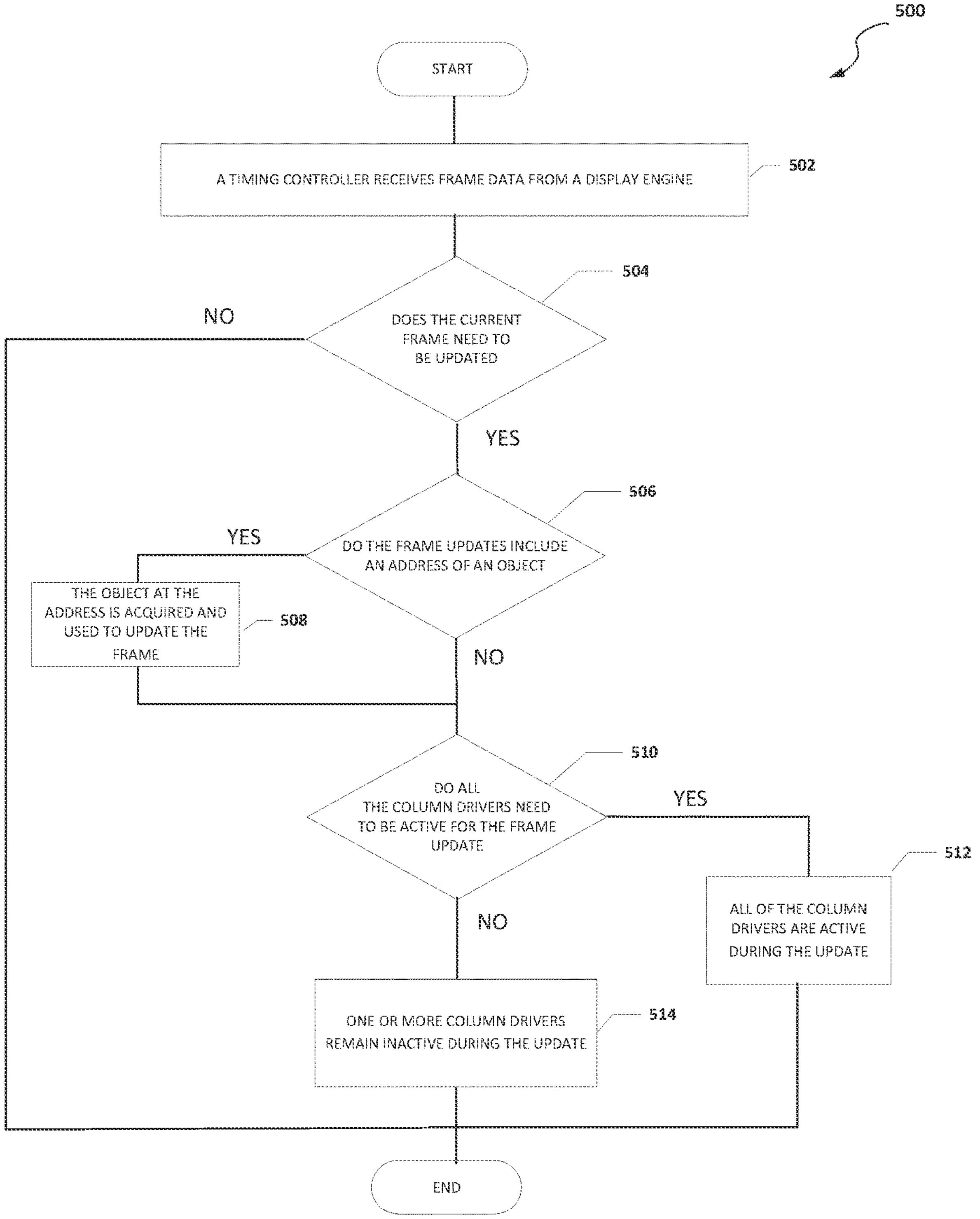
FIG. 5 is a simplified flowchart illustrating potential operations that may be associated with the system in accordance with an embodiment of the present disclosure.

Turning to FIG. 5, FIG. 5 is an example flowchart illustrating possible operations of a flow 500 that may be associated with enabling a low power display refresh during a semi-active workload, in accordance with an embodiment. In an embodiment, one or more operations of flow 500 may be performed by display engine 110*a* and TCON 112*a*, and display engine 110*b* and TCONs 112*b* and 112*c*. At 502, a TCON receives frame data from a display engine. At 504, the system determines if the current frame needs to be updated. For example, the display engine may send a partial frame update to the TCON. In another example, the display engine may lack the ability to determine what portion of the frame content changes and the display engine sends the full frame update (independent of whether there is a change). TCON can be configured to determine what changes are needed to update the frame (e.g., by comparing a cyclic redundancy check per column between incoming frame data and the frame data that is stored in the local frame buffer, using an XOR of previous pixel content and current pixel content, etc.) and then power manage the column driver(s) accordingly.

If the current frame does not need to be updated, then the process ends and the current frame is not updated. If the current frame does need to be updated, then the system determines if the frame updates include an address of an object, as in 506. If the frame updates include an address of an object, then the object at the address is acquired and used to update the frame, as in 508, and the system determines if all the column drivers need to be active to update the current frame, as in 510. If the frame updates do not include an address of an object, then the system determines if all the column drivers need to be active to update the current frame, as in 510. If all the column drivers do need to be active to update the current frame, then all the column drivers are active during the frame update, as in 512. If all the column drivers do not need to be active to update the current frame, then one or more column drivers remain inactive during the frame update, as in 514.

Figure 6:
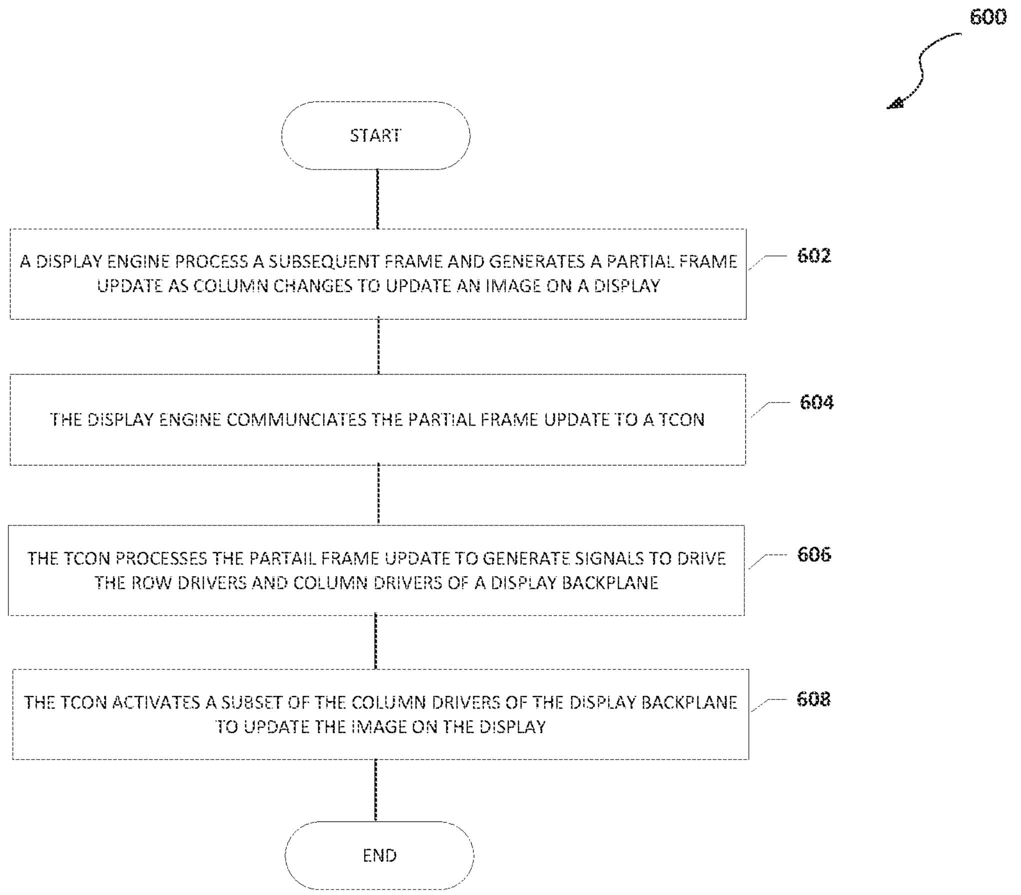
FIG. 6 is a simplified flowchart illustrating potential operations that may be associated with the system in accordance with an embodiment of the present disclosure.

Turning to FIG. 6, FIG. 6 is an example flowchart illustrating possible operations of a flow 600 that may be associated with enabling a low power display refresh during a semi-active workload, in accordance with an embodiment. In an embodiment, one or more operations of flow 600 may be performed by display engine 110*a* and TCON 112*a*, and display engine 110*b* and TCONs 112*b* and 112*c*. At 602, a display engine processes a subsequent frame and generates a partial frame update as column changed to update an image on a display. At 604, the display engine communicates the partial frame update to a TCON. At 606, the TCON processes the partial frame update to generate signals to drive the row drivers and column drivers of a display backplane. At 608, the TCON activates a subset of the column drivers of the display backplane to update the image on the display. In an example, the TCON also activates a subset of the row drivers of the display backplane to update the image on the display. In another example, all of the row drivers of the display backplane are activated to update the image on the display.

Figure 7:
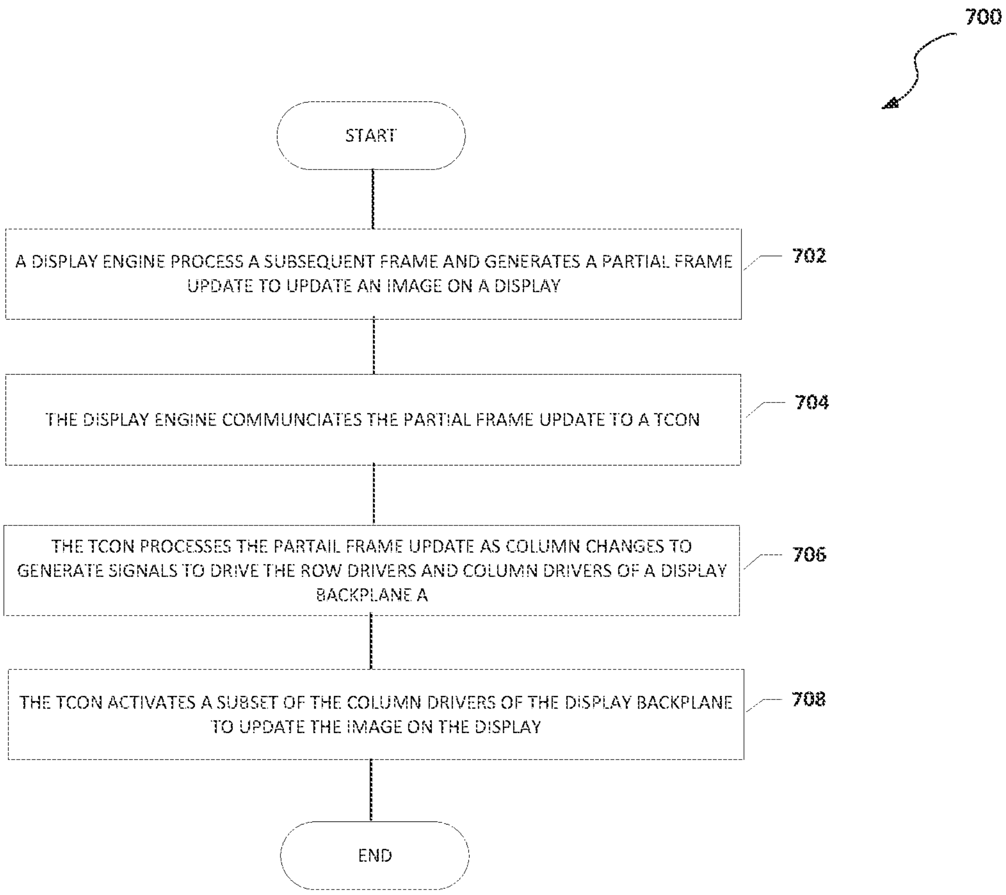
FIG. 7 is a simplified flowchart illustrating potential operations that may be associated with the system in accordance with an embodiment of the present disclosure.

Turning to FIG. 7, FIG. 7 is an example flowchart illustrating possible operations of a flow 700 that may be associated with enabling a low power display refresh during a semi-active workload, in accordance with an embodiment. In an embodiment, one or more operations of flow 700 may be performed by display engine 110*a* and TCON 112*a*, and display engine 110*b* and TCONs 112*b* and 112*c*. At 702, a display engine processes a subsequent frame and generated a partial frame update to update an image on a display. At 704, the display engine communicates the partial frame update to a TCON. AT 706, the TCON processes the partial frame update as column changes to generate signals to drive the row drivers and column drivers of a display backplane. At 708, the TCON activates a subset of the column drivers of the display backplane to update the image on the display. In an example, the TCON also activates a subset of the row drivers of the display backplane to update the image on the display. In another example, all of the row drivers of the display backplane are activated to update the image on the display.

Figure 8:
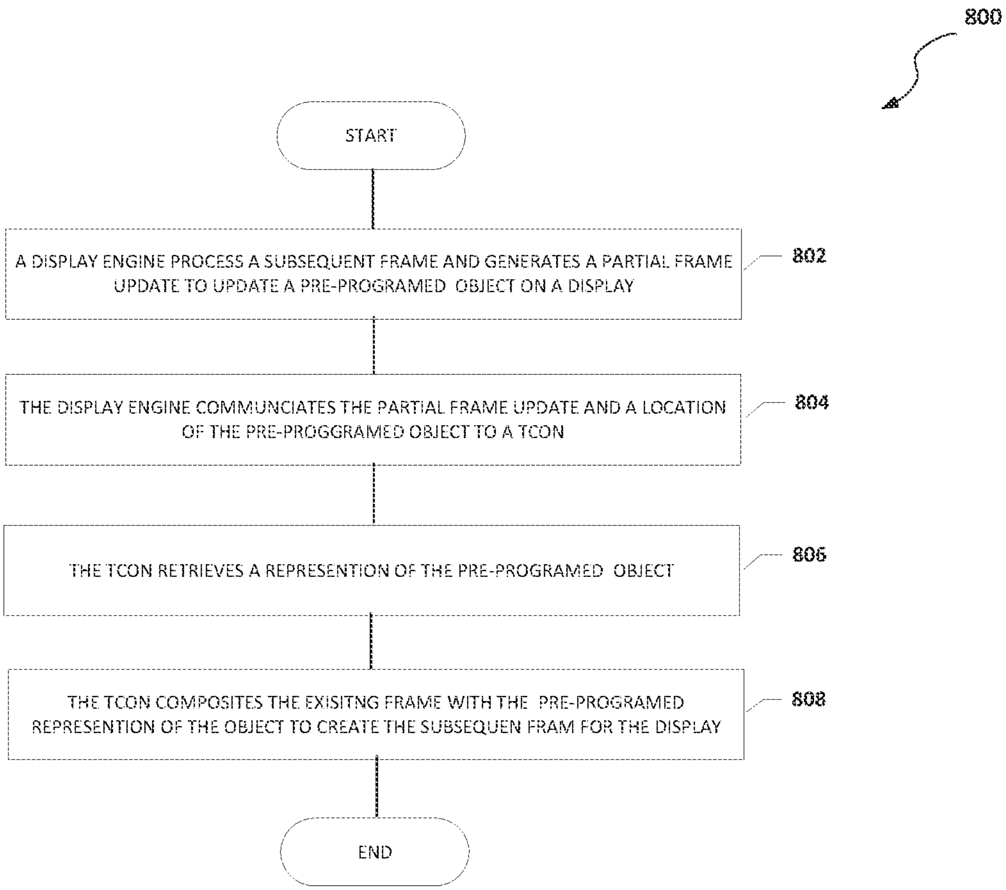
FIG. 8 is a simplified flowchart illustrating potential operations that may be associated with the system in accordance with an embodiment of the present disclosure.

Turning to FIG. 8, FIG. 8 is an example flowchart illustrating possible operations of a flow 800 that may be associated with enabling a low power display refresh during a semi-active workload, in accordance with an embodiment. In an embodiment, one or more operations of flow 800 may be performed by display engine 110*a* and TCON 112*a*, and display engine 110*b* and TCONs 112*b* and 112*c*. At 802, a display engine processes a subsequent frame and generates a partial frame update to update a pre-programmed object on a display. At 804, the display engine communicates the partial frame update and a location of the pre-programed object to a TCON. For example, the location of the pre-programed object may be a starting address in memory of the pre-programed object. At 806, the TCON retrieves a representation of the pre-programed object. For example, the representation may of the pre-programed object may be a bit map of the pre-programed object. At 808, the TCON composites the exiting frame with the pre-programmed representation of the object to create the subsequent frame for the display.

Figure 9:
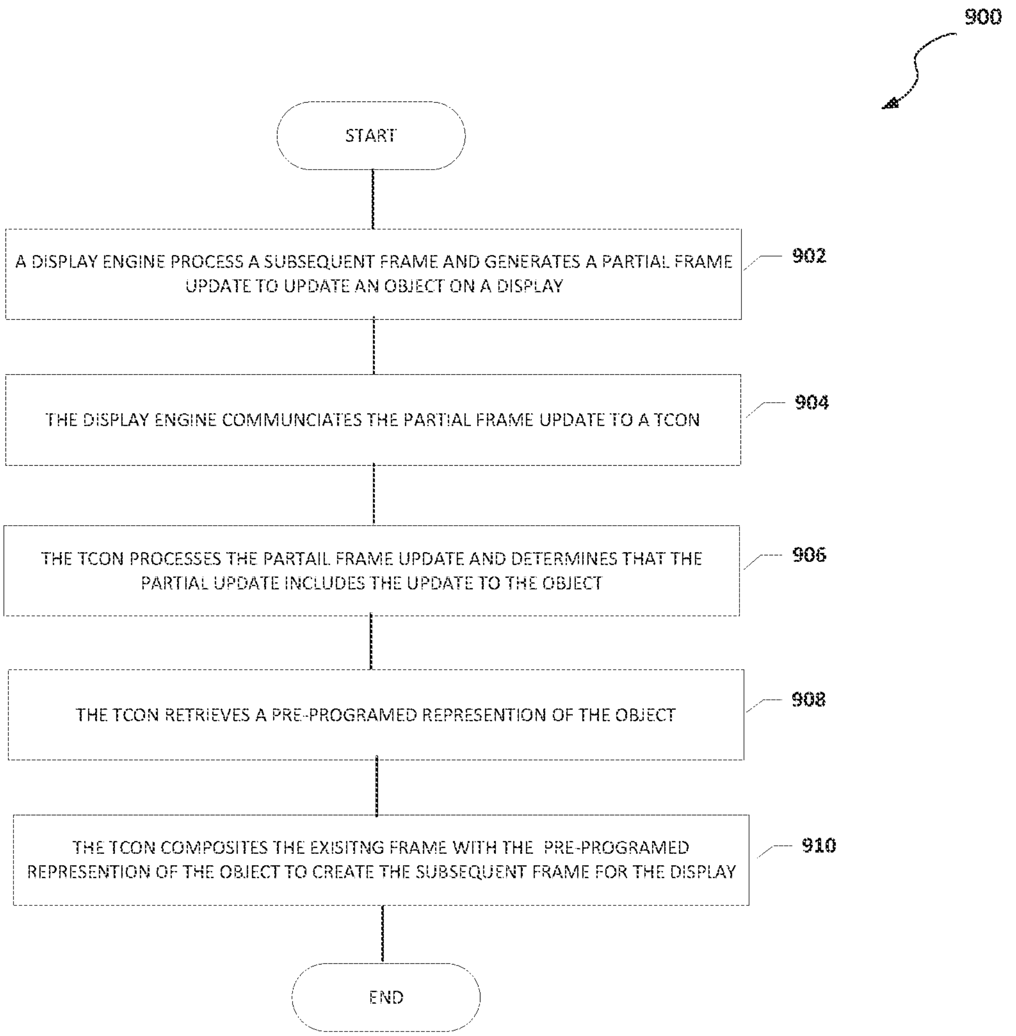
FIG. 9 is a simplified flowchart illustrating potential operations that may be associated with the system in accordance with an embodiment of the present disclosure.

Turning to FIG. 9, FIG. 9 is an example flowchart illustrating possible operations of a flow 900 that may be associated with enabling a low power display refresh during a semi-active workload, in accordance with an embodiment. In an embodiment, one or more operations of flow 900 may be performed by display engine 110*a* and TCON 112*a*, and display engine 110*b* and TCONs 112*b* and 112*c*. At 902, a display engine processes a subsequent frame and generates a partial frame update to update an object on a display. At 904, the display engine communicates the partial frame update to a TCON. At 906, the TCON process the partial frame update and determines that the partial update includes the update to the object. At 908, the TCON retrieves a pre-programed representation of the object. At 910, the TCON composites the exiting frame with the pre-programmed representation of the object to create the subsequent frame for the display.

Figure 10:
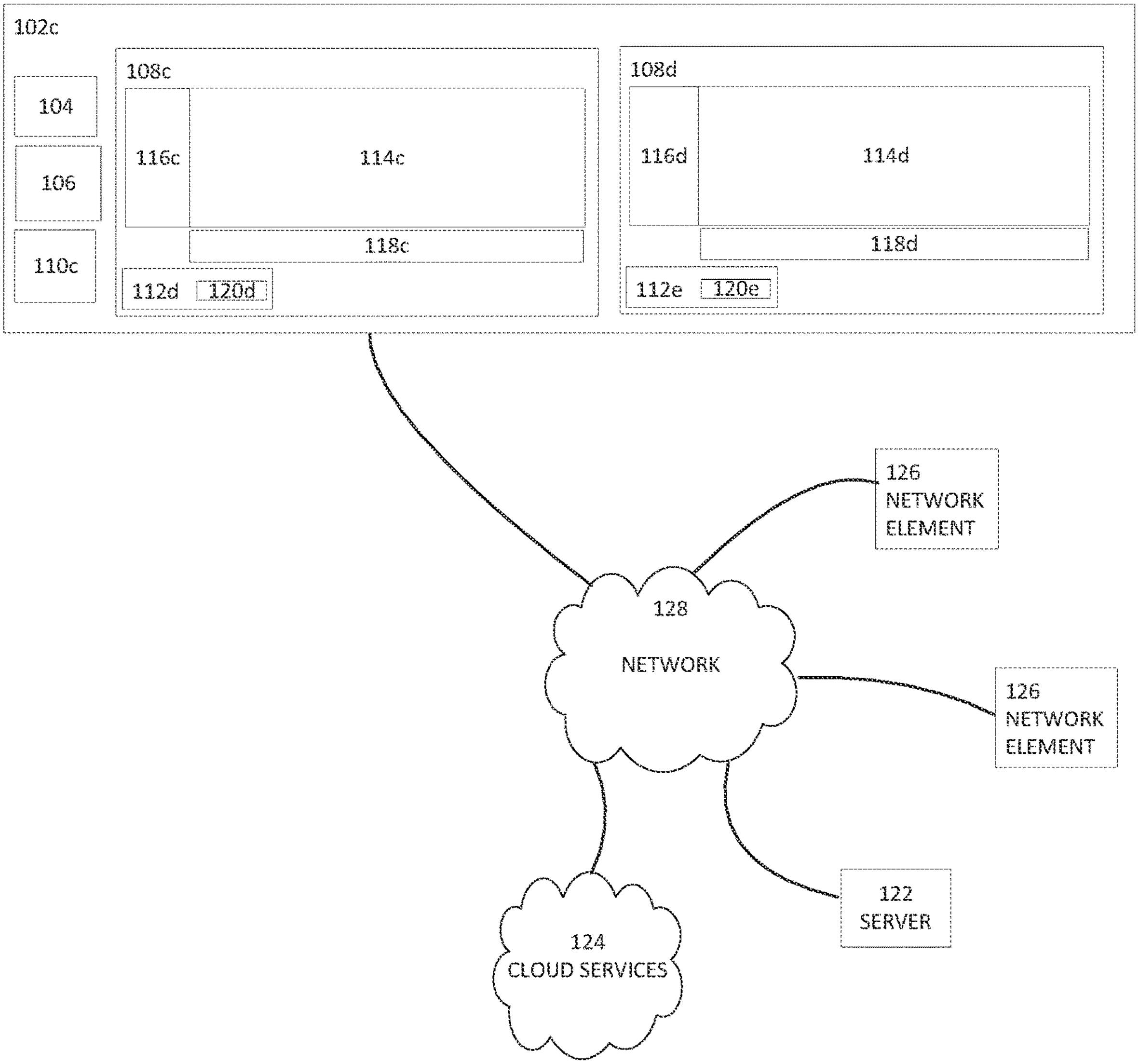
FIG. 10 is a simplified block diagram of an electronic device that includes a system to enable a low power display refresh during a semi-active workload, in accordance with an embodiment of the present disclosure.

Turning to FIG. 10, FIG. 10 is a simplified block diagram of electronic device 102*c* configured to enable a low power display refresh during a semi-active workload, in accordance with an embodiment of the present disclosure. In an example, electronic device 102*c* can include memory 104, one or more processors 106, a first display panel 108*c*, a second display panel 108*d*, and a display engine 110*c*. Display panel 108*c* can include a TCON 112*d*, a display backplane 114*c*, a plurality of row drivers 116*c*, and a plurality of column drivers 118*c*. In some examples, TCON 112*d* can include a remote frame buffer 120*d*. Display panel 108*d* can include a TCON 112*e*, a display backplane 114*d*, a plurality of row drivers 116*d*, and a plurality of column drivers 118*a*. In some examples, TCON 112*e* can include a remote frame buffer 120*e*.

Electronic device 102*c* (and electronic devices 102*a* and 102*b*, not shown) may be a standalone device or in communication with cloud services 124, a server 122 and/or one or more network elements 126 using network 128. Network 128 represents a series of points or nodes of interconnected communication paths for receiving and transmitting packets of information. Network 128 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In network 128, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks.

Figure 11:
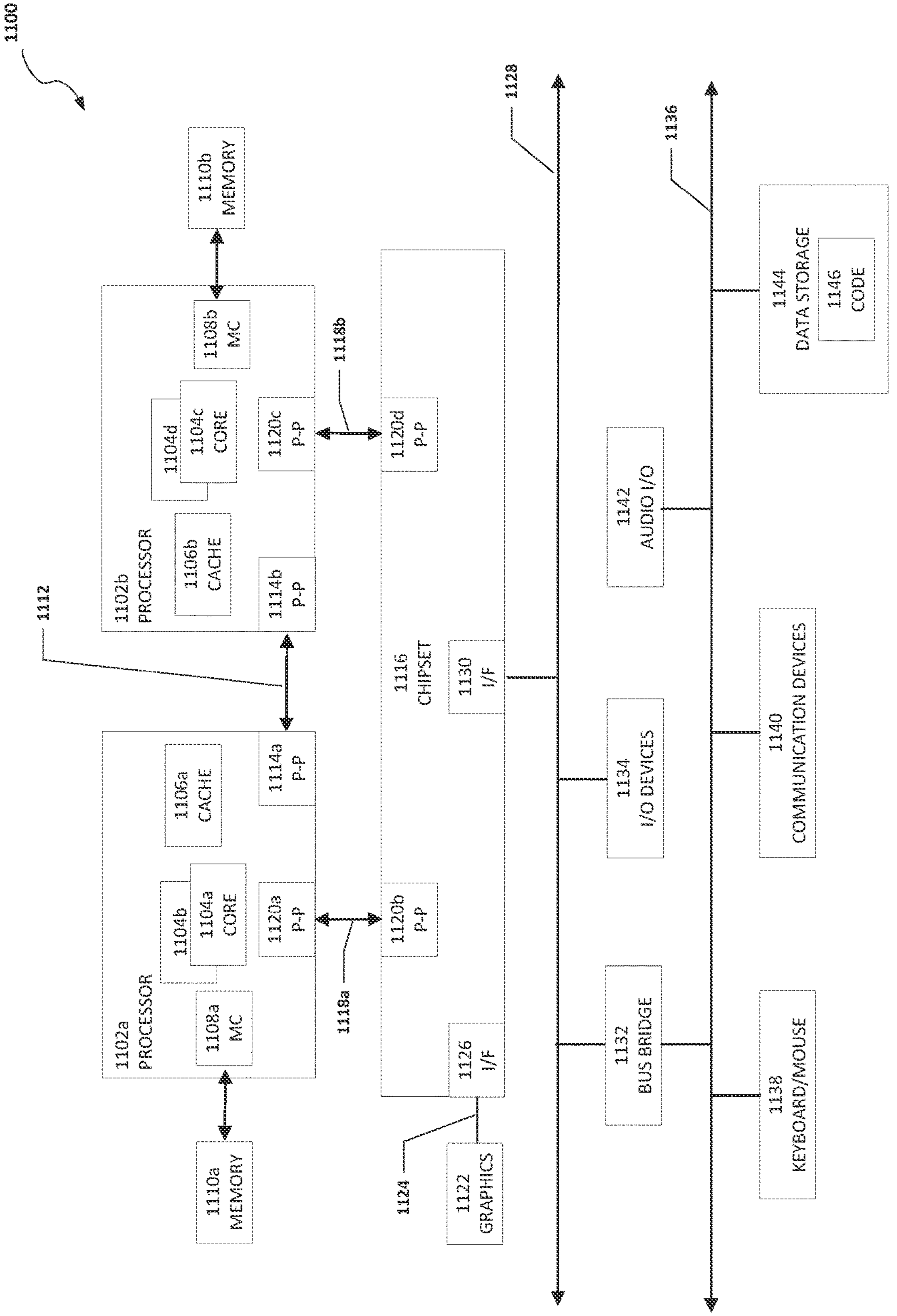
FIG. 11 is a block diagram illustrating an example computing system that is arranged in a point-to-point configuration in accordance with an embodiment.

Turning to FIG. 11, FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the network elements of system 100 may be configured in the same or similar manner as computing system 1100.

As illustrated in FIG. 11, system 1100 may include several processors, of which only two, processors 1102*a* and 1102*b*, are shown for clarity. While two processors 1102*a* and 1102*b* are shown, it is to be understood that an embodiment of system 1100 may also include only one such processor. Processors 1102*a* and 1102*b* may each include a set of cores (i.e., processors cores 1104*a* and 1104*b* and processors cores 1104*c* and 1104*d*) to execute multiple threads of a program. The cores may be configured to execute instruction code in a manner similar to that discussed above with reference to FIGS. 1-8. Each processor 1102*a* and 1102*b* may include at least one shared cache 1106*a* and 1106*b* respectively. Shared caches 1106*a* and 1106*b* may each store data (e.g., instructions) that are utilized by one or more components of processors 1102*a* and 1102*b*, such as processor cores 1104*a* and 1104*b* of processor 1102*a* and processor cores 1104*c* and 1104*d* of processor 1102*b*.

Processors 1102*a* and 1102*b* may also each include integrated memory controller logic (MC) 1108*a* and 1108*b* respectively to communicate with memory elements 1110*a* and 1110*b*. Memory elements 1110*a* and/or 1110*b* may store various data used by processors 1102*a* and 1102*b*. In alternative embodiments, memory controller logic 1108*a* and 1108*b* may be discrete logic separate from processors 1102*a* and 1102*b*.

Processors 1102*a* and 1102*b* may be any type of processor and may exchange data via a point-to-point (PtP) interface 1112 using point-to-point interface circuits 1114*a* and 1114*b* respectively. Processors 1102*a* and 1102*b* may each exchange data with a chipset 1116 via individual point-to-point interfaces 1118*a* and 1118*b* using point-to-point interface circuits 1120*a*-1120*d*. Chipset 1116 may also exchange data with a high-performance graphics circuit 1122 via a high-performance graphics interface 1124, using an interface circuit 1126, which could be a PtP interface circuit. In alternative embodiments, any or all of the PtP links illustrated in FIG. 11 could be implemented as a multi-drop bus rather than a PtP link.

Chipset 1116 may be in communication with a bus 1128 via an interface circuit 1130. Bus 1128 may have one or more devices that communicate over it, such as a bus bridge 1132 and I/O devices 1134. Via a bus 1136, bus bridge 1132 may be in communication with other devices such as a keyboard/mouse 1138 (or other input devices such as a touch screen, trackball, etc.), communication devices 1140 (such as modems, network interface devices, or other types of communication devices that may communicate through a network), audio I/O devices 1142, and/or a data storage device 1144. Data storage device 1144 may store code 1146, which may be executed by processors 1102*a* and/or 1102*b*. In alternative embodiments, any portions of the bus architectures could be implemented with one or more PtP links.

The computer system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 12:
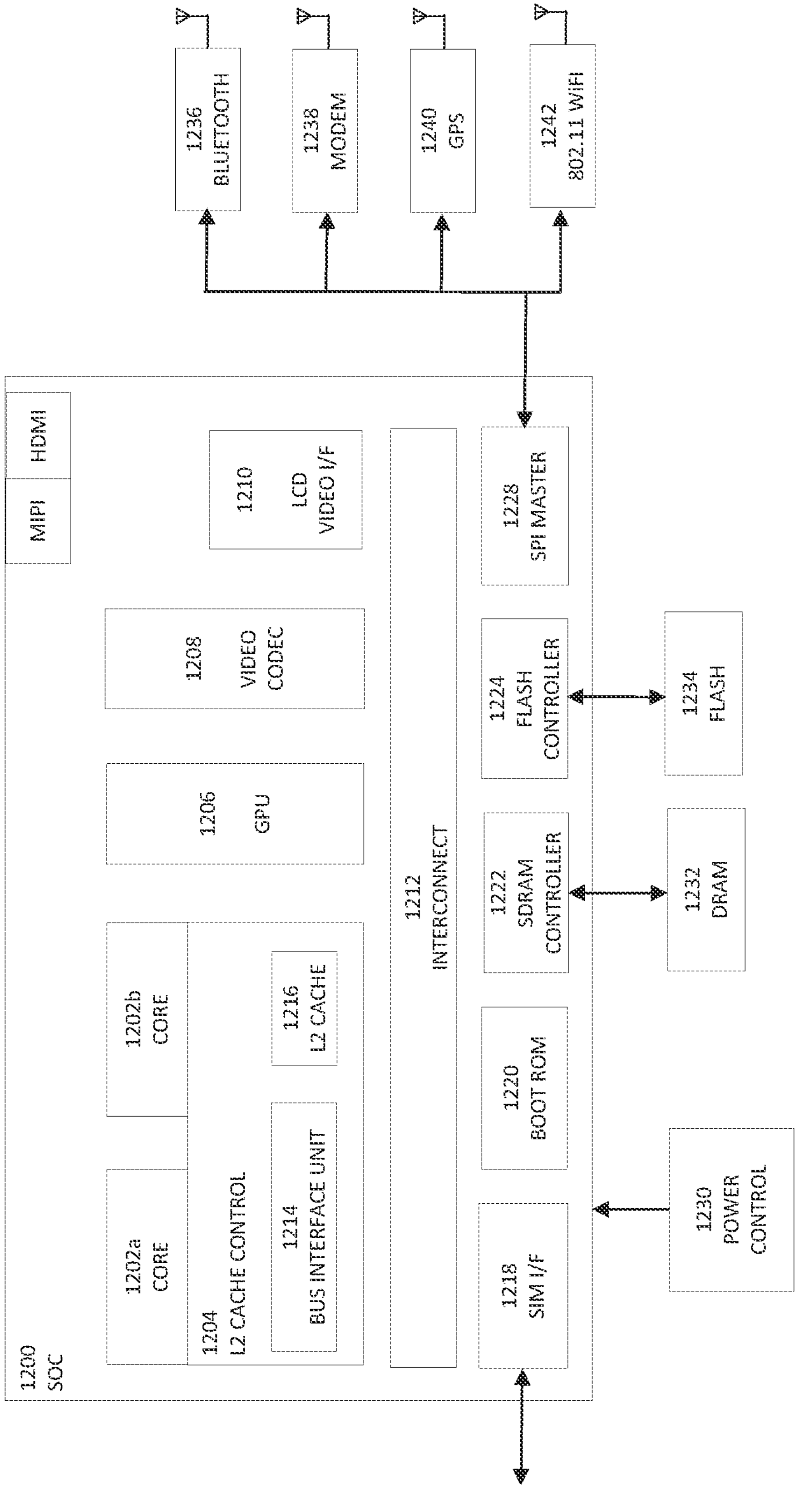
FIG. 12 is a simplified block diagram associated with an example ARM ecosystem system on chip (SOC) of the present disclosure.

Turning to FIG. 12, FIG. 12 is a simplified block diagram associated with an example ecosystem SOC 1200 of the present disclosure. At least one example implementation of the present disclosure can include the device pairing in a local network features discussed herein and an ARM component. For example, the example of FIG. 12 can be associated with any ARM core (e.g., A-9, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 12, ecosystem SOC 1200 may include multiple cores 1202*a* and 1202*b*, an L2 cache control 1204, a graphics processing unit (GPU) 1206, a video codec 1208, a liquid crystal display (LCD) I/F 1210 and an interconnect 1212. L2 cache control 1204 can include a bus interface unit 1214, a L2 cache 1216. Liquid crystal display (LCD) I/F 1210 may be associated with mobile industry processor interface (MIPI)/high-definition multimedia interface (HDMI) links that couple to an LCD.

Ecosystem SOC 1200 may also include a subscriber identity module (SIM) I/F 1218, a boot read-only memory (ROM) 1220, a synchronous dynamic random-access memory (SDRAM) controller 1222, a flash controller 1224, a serial peripheral interface (SPI) master 1228, a suitable power control 1230, a dynamic RAM (DRAM) 1232, and flash 1234. In addition, one or more embodiments include one or more communication capabilities, interfaces, and features such as instances of Bluetooth™ 1236, a 3G modem 1238, a global positioning system (GPS) 1240, and an 802.11 Wi-Fi 1042.

In operation, the example of FIG. 12 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 13:
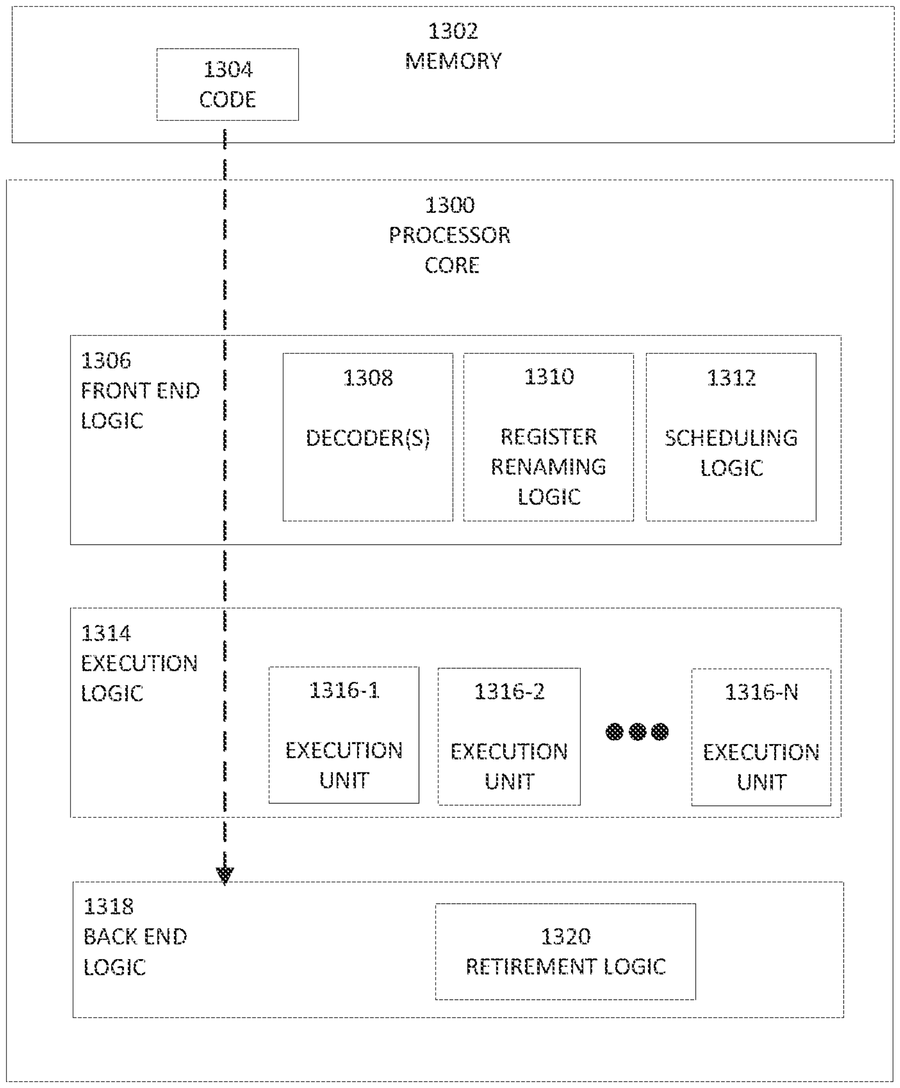
FIG. 13 is a block diagram illustrating an example processor core in accordance with an embodiment.

Turning to FIG. 13, FIG. 13 illustrates a processor core 1300 according to an embodiment. Processor core 1300 may be the core for any type of processor, such as a microprocessor, an embedded processor, a digital signal processor (DSP), a network processor, or other device to execute code. Although only one processor core 1300 is illustrated in FIG. 13, a processor may alternatively include more than one of the processor core 1300 illustrated in FIG. 13. For example, processor core 1300 represents one example embodiment of processors cores 1104*a*-1104*d* shown and described with reference to processors 1102*a* and 1102*b* of FIG. 11. Processor core 1300 may be a single-threaded core or, for at least one embodiment, processor core 1300 may be multi-threaded in that it may include more than one hardware thread context (or "logical processor") per core.

FIG. 13 also illustrates a memory 1302 coupled to processor core 1300 in accordance with an embodiment. Memory 1302 may be any of a wide variety of memories (including various layers of memory hierarchy) as are known or otherwise available to those of skill in the art. Memory 1302 may include code 1304, which may be one or more instructions, to be executed by processor core 1300. Processor core 1300 can follow a program sequence of instructions indicated by code 1304. Each instruction enters a front-end logic 1306 and is processed by one or more decoders 1308. The decoder may generate, as its output, a micro operation such as a fixed width micro operation in a predefined format, or may generate other instructions, microinstructions, or control signals that reflect the original code instruction. Front-end logic 1306 also includes register renaming logic 1310 and scheduling logic 1312, which generally allocate resources and queue the operation corresponding to the instruction for execution.

Processor core 1300 can also include execution logic 1314 having a set of execution units 1316-1 through 1316-N. Some embodiments may include a number of execution units dedicated to specific functions or sets of functions. Other embodiments may include only one execution unit or one execution unit that can perform a particular function. Execution logic 1314 performs the operations specified by code instructions.

After completion of execution of the operations specified by the code instructions, back-end logic 1318 can retire the instructions of code 1304. In one embodiment, processor core 1300 allows out of order execution but requires in order retirement of instructions. Retirement logic 1320 may take a variety of known forms (e.g., re-order buffers or the like). In this manner, processor core 1300 is transformed during execution of code 1304, at least in terms of the output generated by the decoder, hardware registers and tables utilized by register renaming logic 1310, and any registers (not shown) modified by execution logic 1314.

Although not illustrated in FIG. 13, a processor may include other elements on a chip with processor core 1300, at least some of which were shown and described herein with reference to FIG. 11. For example, as shown in FIG. 11, a processor may include memory control logic along with processor core 1300. The processor may include I/O control logic and/or may include I/O control logic integrated with memory control logic.

It is important to note that the operations in the preceding flow diagram (i.e., FIG. 5) illustrates only some of the possible correlating scenarios and patterns that may be executed by, or within, electronic devices 100*a*-100*c*. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 100*a*-100*c* in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 100*a*-100*c* have been illustrated with reference to particular elements and operations, these elements and operations may be replaced by any suitable architecture, protocols, and/or processes that achieve the intended functionality of electronic devices 100*a* and 100*b*.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example A1, is a display panel including a display backplane, a plurality of row drivers, a plurality of column drivers, and a timing controller. The timing controller receives a partial update to a frame being displayed as an image on the display backplane and updates the image displayed on the display backplane by activating row drivers and a subset of a plurality of available column drivers, where the subset is based on the update.

In Example A2, the subject matter of Example A1 can optionally include where more than half of the plurality of column drivers are not active during the update of the frame.

In Example A3, the subject matter of any one of Examples A1-A2 can optionally include where the partial update to the frame is to update a pre-programmed object.

In Example A4, the subject matter of any one of Examples A1-A3 can optionally include where an address of the pre-programmed object to be updated is sent to the timing controller during a vertical blanking interval.

In Example A5, the subject matter of any one of Examples A1-A4 can optionally include where the address is a starting address of a bitmap for the pre-programmed object to be updated.

In Example A6, the subject matter of any one of Examples A1-A5 can optionally include where the timing controller is integrated with the plurality of column drivers.

In Example A7, the subject matter of any one of Examples A1-A6 can optionally include a second timing controller, where the timing controller controls a first portion of the display backplane and the second timing controller controls a second portion of the display backplane.

In Example A8, the subject matter of any one of Examples A1-A7 can optionally include a plurality of timing controllers, where each of the plurality of timing controllers control a different portion of the display backplane.

Example M1 is a method including receiving a frame to displayed as an image on a display backplane, generating an image on the display backplane using the frame, receiving a partial update to the frame being displayed as the image on the display backplane, and updating the image displayed on the display backplane by activating row drivers and a subset of a plurality of available column drivers, where the subset is based on the update to the frame.

In Example M2, the subject matter of Example M1 can optionally include where a timing controller receives the partial update to the frame and determines the subset of the plurality of column drivers that are activated.

In Example M3, the subject matter of any one of the Examples M1-M2 can optionally include where a timing controller receives the partial update to the frame from a display engine and the partial update to the frame from the display includes the subset of the plurality of column drivers that are activated.

In Example M4, the subject matter of any one of the Examples M1-M3 can optionally include where the partial update to the frame is to update a pre-programmed object.

In Example M5, the subject matter of any one of the Examples M1-M4 can optionally include where an address of the pre-programmed object to be updated is sent to a timing controller during a vertical blanking interval.

In Example M6, the subject matter of any one of the Examples M1-M5 can optionally include where the address is a starting address of a bitmap for the object to be updated.

In Example M7, the subject matter of any one of the Examples M1-M6 can optionally include where a timing controller is used to update the image on the display and the timing controller is integrated with the plurality of column drivers.

Example S1 is a system for enabling a low power display refresh during a semi-active workload. The system including a display engine and a display panel, where a frame is used by the display panel to generate an image on a display backplane. The display panel includes a display backplane, a plurality of row drivers, a plurality of column driver, and a timing controller. The timing controller receives a partial update to a frame being displayed as an image on the display backplane, and updates the image displayed on the display backplane by activating a subset of the plurality of row drivers and a subset of the plurality of column drivers, where the subset is based on the update.

In Example S2, the subject matter of Example S1 can optionally include where the timing controller determines the subset of the plurality of column drivers that are activated.

In Example S3, the subject matter of any one of the Examples S1-S2 can optionally include where the partial update to the frame is to update a pre-programmed object.

In Example S4, the subject matter of any one of the Examples S1-S3 can optionally include where an address of the object to be updated is sent to the timing controller during a vertical blanking interval.

In Example S5, the subject matter of any one of the Examples S1-S4 can optionally include where the address is a starting address of a bitmap for the object to be updated.

What is claimed is:

1. A display panel, comprising:

a display backplane;

a plurality of row drivers;

a plurality of column drivers; and a timing controller, wherein the timing controller:

receives a partial update to a frame being displayed as an image on the display backplane, wherein the partial update is a row-wise operation where only a subset of the row drivers are to be activated and all of the column drivers are to be activated;

converts the partial update from the row-wise operation where only a subset of the row drivers are to be activated and all of the column drivers are to be activated to a column-wise operation where only a subset of the column drivers are to be activated; and updates the image displayed on the display backplane by activating row drivers and the subset of column drivers, wherein the subset is based on the partial update.

2. The display panel of claim 1, wherein more than half of the plurality of column drivers are not active during the partial update of the frame.

3. The display panel of claim 1, wherein the partial update to the frame is to update a pre-programmed object.

4. The display panel of claim 3, wherein an address of the pre-programmed object to be updated is sent to the timing controller during a vertical blanking interval.

5. The display panel of claim 4, wherein the address is a starting address of a bitmap for the pre-programmed object to be updated.

6. The display panel of claim 1, wherein the timing controller is integrated with the plurality of column drivers.

7. The display panel of claim 1, further comprising:

a second timing controller, wherein the timing controller controls a first portion of the display backplane and the second timing controller controls a second portion of the display backplane.

8. The display panel of claim 1, further comprising:

a plurality of timing controllers, wherein each of the plurality of timing controllers control a different portion of the display backplane.

9. The display panel of claim 1, wherein all of the row drivers are activated when the image displayed on the display backplane is updated.

10. The display panel of claim 1, wherein only a portion of the row drivers are activated when the image displayed on the display backplane is updated.

11. A method comprising:

receiving a frame to displayed as an image on a display backplane;

generating an image on the display backplane using the frame;

receiving a partial update to the frame being displayed as the image on the display backplane, wherein the partial update is a row-wise operation where only a subset of row drivers are to be activated and all column drivers are to be activated;

converting the partial update from the row-wise operation to a column-wise operation where only a subset of the column drivers are to be activated; and updating the image displayed on the display backplane by activating row drivers and the subset of column drivers, wherein the subset is based on the partial update to the frame.

12. The method of claim 11, wherein a timing controller receives the partial update to the frame and determines the subset of the column drivers that are to be activated.

13. The method of claim 11, wherein the partial update to the frame is to update a pre-programmed object.

14. The method of claim 13, wherein an address of the pre-programmed object to be updated is sent to a timing controller during a vertical blanking interval.

15. The method of claim 14, wherein the address is a starting address of a bitmap for the pre-programmed object to be updated.

16. A system for enabling a low power display refresh during a semi-active workload, the system comprising:

a display engine; and a display panel, wherein a frame is used by the display panel to generate an image on a display backplane, wherein the display panel includes:

a display backplane;

a plurality of row drivers;

a plurality of column drivers; and a timing controller, wherein the timing controller:

receives a partial update to a frame being displayed as an image on the display backplane, wherein the partial update is a row-wise operation where only a subset of the row drivers are to be activated and all of the column drivers are to be activated;

converts the partial update from the row-wise operation to a column-wise operation where only a subset of the column drivers are to be activated; and updates the image displayed on the display backplane by activating a subset of the plurality of row drivers and the subset of the plurality of column drivers, wherein the subset is based on the partial update.

17. The system of claim 16, wherein the timing controller determines the subset of the plurality of column drivers that are activated.

18. The system of claim 16, wherein the partial update to the frame is to update a pre-programmed object.

19. The system of claim 18, wherein an address of the pre-programmed object to be updated is sent to the timing controller during a vertical blanking interval.

20. The system of claim 19, wherein the address is a starting address of a bitmap for the pre-programmed object to be updated.

* * * * *